United States Patent Office 3,271,476
Patented Sept. 6, 1966

3,271,476
CURABLE MIXTURES OF EPOXY RESINS AND POLYANHYDRIDES OR POLYCARBOXYLIC ACIDS
Franz Rudolf Widmer, Basel, Alfred Renner, Allschwil, and Hans Orth, Binningen, Switzerland, assignors to Ciba Limited, Basel, Switzerland, a Swiss company
No Drawing. Filed Feb. 28, 1963, Ser. No. 261,890
Claims priority, application Switzerland, Mar. 1, 1962, 2,522/62
11 Claims. (Cl. 260—835)

The present invention relates to hot-curable mixtures containing
(1) A 1:2-epoxy compound and
(2) As curing agent a polyanhydride obtained by reacting at most $n$ molecular proportions of an unsaturated dicarboxylic acid anhydride of the formula (Ia) 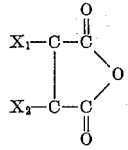

or (Ib) 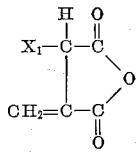

(where $X_1$ and $X_2$ each represents a hydrogen atom or a methyl group) with 1 molecular proportion of a poly-(cyclopentadienyl) compound of the formula (II) 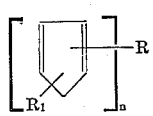

(where $R_1$ represents a hydrogen atom or a methyl group, and $n=2$, 3 or 4, and R stands for an n-valent radical, more especially

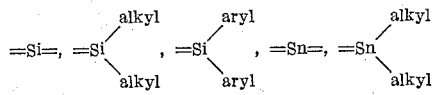

or for a bivalent aliphatic, cycloaliphatic, araliphatic or aromatic hydrocarbon radical which may be interrupted by oxygen atoms or substituted by hydroxyl groups or halogen atoms) and/or a polycarboxylic acid obtained by hydrolysing such a polyanhydride.

Preferred curing agents are the reaction products from at most 2 molecular proportions of a dicarboxylic acid anhydride of the Formula Ia or Ib and 1 molecular proportion of a dicyclopentadienyl compound of the Formula II—where $n=2$—or a hydrolysis product thereof.

Such reaction products consist as a rule substantially of Diels-Alder adducts of the formula (IIIa) 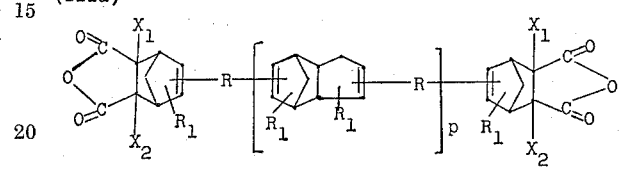

or

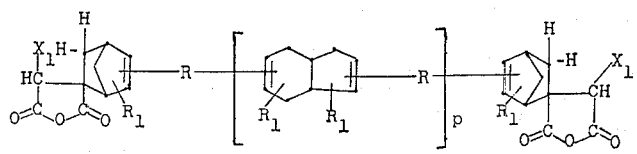

where the symbols $X_1$, $X_2$, $R_1$ and R have the same meanings as in the Formulae I, IIa and IIb, and $p$ is a small whole number, preferably 0, 1 or 2.

The corresponding hydrolysis products consists substantially of tetracarboxylic acids of the formula (IIIa') 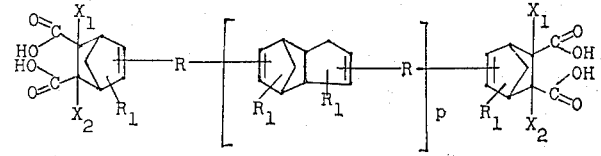

or (IIIb') 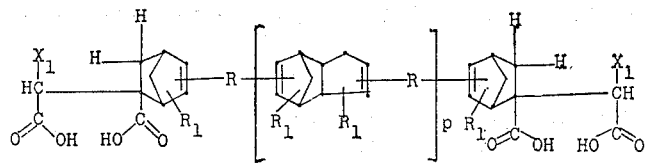

in which $X_1$, $X_2$, $R_1$, R and $p$ have the same meanings as defined above.

In certain cases the Diels-Alder adducts may further contain a share of dimerized or polymerized dicyclopentadienyl compounds that correspond to the general formula

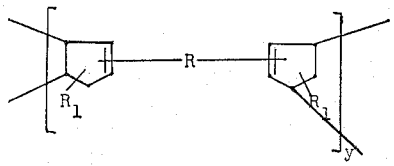

in which $R_1$ and R have the same meanings as in Formula II and $y$ is a whole number, being at least 2.

Compared with the dianhydrides and polyanhydrides of polybasic carboxylic acids hitherto used for this purpose, such, for example, as pyromellitic dianhydride or oligomeric copolymers of maleic acid anhydride and styrene—which in general have high melting points and are difficult to mix with the conventional epoxy resins— the Diels-Alder adducts used in the curable mixtures of the invention offer the unexpected advantage that they are either liquid or have a relatively low softening point and that they are extremely easy to mix with most conventional epoxy resins. In addition, the mixtures of epoxy resins and Diels-Alder adducts have in general a longer pot life than mixtures of epoxy resins with the dianhydrides or polyanhydrides previously used as curing agents. Epoxy resins cured with Diels-Alder adducts have mechanical properties, more especially a high shape stability at elevated temperatures, that are certainly equal to those of epoxy resins cured with the known dianhydrides of polyanhydrides.

The hot-curable mixtures obtained by a preferred embodiment of the invention contain (1) A 1:2 - epoxy compound having a 1:2 - epoxide equivalence greater than 1, (2) As curing agent a polyanhydride obtained by reacting less than 2 molecular equivalents of an unsaturated dicarboxylic acid anhydride of the Formula I$a$ or I$b$ with 1 molecular proportion of a dicyclopentadienyl compound of the formula (V)

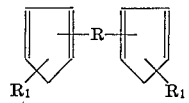

where $R_1$ and $R$ have the same meanings as in the Formula II—and/or the hydrolysis products of such polyanhydrides, and (3) An unsaturated dienophilic compound having a nonaromatic carbon-to-carbon double bond equivalence and/or carbon-to-carbon triple bond equivalence totalling more than 2, more especially an unsaturated polyester.

The reaction products from less than 2 mols of the unsaturated dicarboxylic acid anhydride and 1 mol of the di(cyclopentadienyl) compound possess potential diene structures and are, therefore, capable not only of reacting with the epoxy compound but also suitable for crosslinking with the dienophilic compound.

When such preferred curable mixtures containing both the epoxy resin and the unsaturated polyester are used as adhesives, the bond possesses a particularly high shear strength such as can be obtained neither by means of the epoxy resin alone nor of the sunsaturated polyester by itself. Moreover, the concomitant use of the unsaturated polyester renders the cured product flexible. It is another advantage offered by such mixtures that up to 80% of the weight of the expensive epoxy resin component can be replaced by the less expensive unsaturated polyester, without appreciably impairing the mechanical properties of the cured products as compared with the use of epoxy resins alone. Moreover, when halogen-containing unsaturated polyesters are used, the cured product displays flame-inhibiting properties.

The present invention further provides a process for the manufacture of cured resins, wherein a mixture consisting of (1) A 1:2-epoxy compound, (2) A polyanhydride obtained by reacting at most $n$ molecular proportions of a dicarboxylic acid anhydride of the Formula I$a$ or I$b$ with 1 molecular proportion of a poly(cyclopentadienyl) compound of the Formula II and/or the hydrolysis product of such a polyanhydride and, if desired, (3) An unsaturated dienophilic compound having a non-aromatic carbon-to-carbon double bond equivalence and/or carbon-to-carbon triple bond equivalence totalling more than 2, more especially an unsaturated polyester, is reacted with heating.

As 1:2-epoxy compounds to be used in the present invention there may be used monoepoxides, such as butylglycide, phenylglycide, cresylglycide, 3:4-epoxy-tetra-hydrodicyclopentadienol - 8, 3:4-epoxy-hexahydrobenzal glycerol or 3:4-epoxy-cyclohexane-1:1-dimethanol-acrolein acetal. Preferred use is made of 1:2-epoxy compounds having an epoxide equivalence greater than 1, that is to say compounds containing $x$ groups of the formula

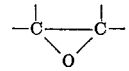

calculated from the average molecular weight, where $x$ is a whole or fractional number greater than 1.

The 1:2-epoxide groups may be either terminal or inner ones. Particularly suitable terminal 1:2-epoxide groups are 1:2-epoxyethyl or 1:2-epoxypropyl groups; preferably, the latter are linked to an oxygen atom, that is to say they are glycidylether or glycidylester groups. Compounds with inner epoxide groups contain at least one 1:2-epoxy group in an aliphatic chain

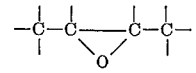

or in a cycloaliphtic ring.

Suitable polyglycidylethers are the known compounds obtained by alkaline condensation of epichlorohydrin with polyols. As polyols there are suitable polyalcohols, such as ethyleneglycol, propyleneglycol, N-phenyldiethanolamine, 1:4-butanediol or hexanetriol, and above all polyphenols such as phenol novolaks or cresol novolaks, resorcinol, pyrocatechol, hydroquinone, 1:4-dihydroxynaphthalene, bis-(4-hydroxyphenyl)-methalphenylmethane, bis-(4-hydroxyphenyl) - tolylmethane, 4:4'-dihydroxydiphenyl, bis-(4-hydroxylphenyl)-sulfone and more especially bis-(4-hydroxyphenyl)-dimethylmethane (bisphenol A).

Polyglycidylethers particularly suitable for use in the present invention correspond to the average formula

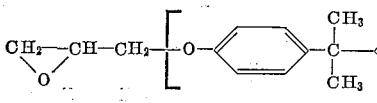 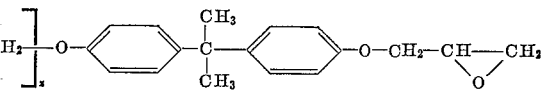

where $z$ is a whole or fractional number from 0 to 6. When $z$ is between 0 and about 0.2, there are obtained diglycidylethers of bisphenol A which are liquid at room temperature and contain about 4.8 to 5.6 epoxide equivalents per kg. Polyglycidylethers of higher molecular weight, containing about 0.5 to 3.5 epoxide equivalents per kg.—for example those in which $z=2, 3, 4, 5$ or $6$— are as a rule solid at room temperature.

Furthermore, there are suitable polyglycidylesters accessible by reacting a dicarboxylic acid with epichlorohydrin or dichlorohydrin in the presence of an alkali; such polyesters may be derived from aliphatic dicarboxylic acids, such as oxalic, succinic, glutaric, adipic, pimelic, suberic, azelaic, sebacic acid, or more especially from aromatic dicarboxylic acids, such as phthalic, isophthalic, diphenylortho:ortho'-dicarboxylic acid, ethyleneglycol-bis-(paracarboxyphenyl)-ether or the like. As examples there may be mentioned diglycidyl adipate and diglycidyl phthalate, as well as diglycidylesters corresponding to the average formula

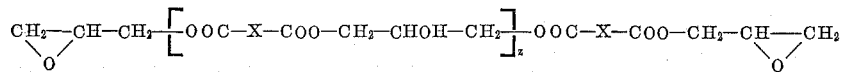

where X represents a phenylene residue and z is a small whole or fractional number.

There may also be used basic polyepoxy compounds such as are obtained by reacting a primary or secondary aliphatic or aromatic diamine, such as aniline, toluidine, 4:4′-diamino-diphenylmethane, 4:4′ - di-(monomethylamino)-diphenylmethane or 4:4′-diaminodiphenyl-sulfone, with epichlorohydrin in the presence of an alkali.

As epoxy compounds containing an inner 1:2-epoxide group there are suitable epoxidised diolefines, dienes or cyclic dienes, such as 1:2:5:6-diepoxyhexane, 1:2:4:5-diepoxycyclohexane, dicyclopentadiene diepoxide, dipentene diepoxide and more especially vinylcyclohexene diepoxide; epoxidized, diolefinically unsaturated carboxylic acid esters, such as methyl-9:10:12:13-diepoxystearate; or the dimethyl ester of 6:7:10:11-diepoxyhexadecane-1:16-dicarboxylic acid. Furthermore, there may be mentioned epoxidized mono-, di- or poly-ethers, mono-, di or poly-esters, mono-, di- or poly-acetals containing at least one cycloaliphatic 5-membered or 6-membered ring, to which at least one 1:2-epoxide group is linked. Suitable compounds of this kind are those of the following formulae

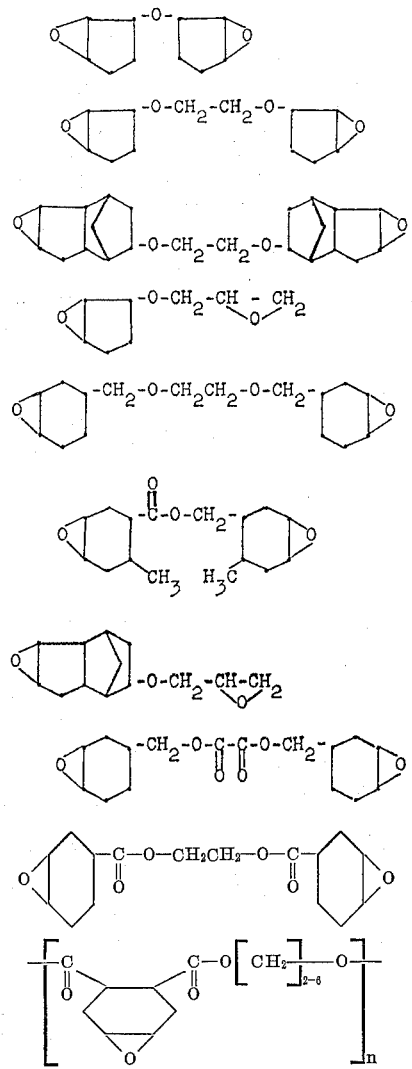

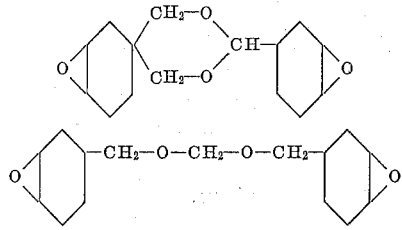

As further compounds containing an inner 1:2-epoxide group there are suitable epoxidized diolefine polymers, more especially polymers of butadiene or cyclopentadiene, and epoxidized fatty oils and fatty esters. Preferred polymers of butadiene are the epoxidized copolymers and, respectively, the adducts with styrene, acrylonitrile, toluene or xylene.

Flame-inhibiting properties in the cured resins are achieved by using 1:2-epoxy compounds that additionally contain halogen, more especially chlorine or bromine. The following examples of such halogen-containing epoxy compounds may be mentioned:

Diglycidylethers of chlorinated bisphenols, 2:3-dichloro-1:4-butanediol diglycidylether, 2:3-dibromo-1:4-butanediol diglycidyl ether, 2:2:3:3-tetrachloro-1:4-butanediol diglycidylether; furthermore compounds of the following formulae

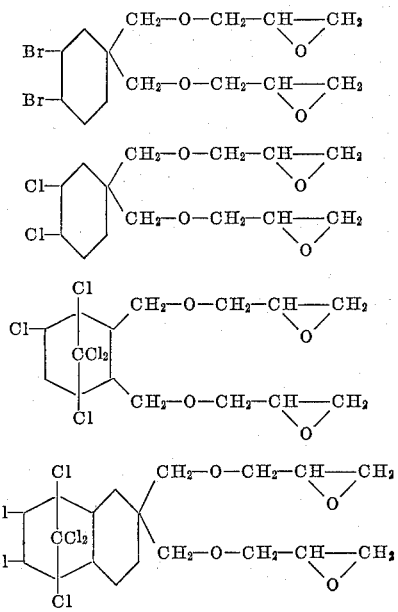

Finally, there are suitable telomers containing epoxide groups, obtained by telomerization of ethylenically unsaturated monoepoxides of the aliphatic or cycloaliphatic series, such as allyl - glycidylether, allyl - phenylglycidylether, 3:4-epoxy-tetrahydrodicyclopentadienyl-8-allyl ether or 3-vinyl-2:4-dioxospiro(5:5)-9:10-epoxy-undecane with telogens, such as carbon tetrachloride, dimethylphosphite or cyclohexanone in the presence of an organic peroxide. If they are derived from telogens containing halogen or phosphorus, such telomers likewise display flame-inhibiting properties.

The manufacture of the Diels-Alder adducts, to be used according to the invention as curing agents for 1:2-epoxides, from unsaturated dicarboxylic acid anhydrides and poly(cyclopentadienyl) compounds advantageously follows the usual practice: The reactants are reacted either at room temperature or with heating, advantageously in the presence of an inert organic solvent.

As dicarboxylic acid anhydrides of the Formula Ia or Ib, to be used as starting materials for the manufacture of the Diels-Alder adducts to be used as curing agents, there may be mentioned citraconic anhydride, itaconic anhydride and maleic anhydride. As poly(cyclopentadienyl) compounds of the Formula II, to be used in the manufacture of the Diels-Alder adducts serving as curing agents, there may be mentioned the following:

bis(cyclopentadienyl)methane,
bis(cyclopentadienyl)phenylmethane,
1:5-bis(cyclopentadienyl)pentane,
1:6-bis(cyclopentadienyl)hexane,
1:9-bis(cyclopentadienyl)nonane;
1:4-bis(cyclopentadienyl)butene-2,
1:4-bis(cyclopentadienyl)butine-2,
$\alpha:\alpha'$-bis(cyclopentadienyl)-para-xylene,
4:6-bis(cyclopentadienyl-methyl)-1:3-dimethylbenzene,
1:3-bis(cyclopentadienyl-methyl)-2:4:6-trimethylbenzene,
2:2'-bis(cyclopentadienyl)diisopropyl ether,
bis[(cyclopentadienyl)-pentenyl] ether,
1:4-bis(cyclopentadienyl)cyclopentene-2,
2:2'-bis(cyclopentadienyl-methyl)-spiro-bi-meta-dioxane,
di-cyclopentadienyl-dimethylsilane,
bis(methyl-cyclopentadienyl)dimethylsilane,
di-cyclopentadienyl-diphenylsilane,
tris(cyclopentadienyl)methylsilane,
tetrakis(cyclopentadienyl)silane, and
tetrakis(cyclopentadienyl)tin.

The unsaturated dienophilic compound, optionally used as a further ingredient, has a non-aromatic carbon-to-carbon double bond or carbon-to-carbon triple bond equivalence totalling more than 2, that is to say that, calculated from the average molecular weight, it contains a total of $y$ non-aromatic carbon-to-carbon double bonds or carbon-to-carbon triple bonds, $y$ being a whole or fractional number greater than 2.

Provided the unsaturated dienophilic compounds (3) referred to above constitute chemically unitary substances having a definable structural formula, their molecule must, accordingly, contain at least 3 non-aromatic carbon-to-carbon double bonds and/or carbon-to-carbon triple bonds. In many cases especially important to industry— such as in the case of the unsaturated polyesters or the butadiene copolymers—it is known that in general these products are mixtures of compounds of different molecular weight and a different double bond content so that the experimentally determined value of the content of double bonds and triple bonds is in fact always an average value. Therefore, the double bond and/or triple bond equivalence of such unsaturated products need not necessarily be a whole number, at least 3, but in each case it must be greater than 2.0.

As such unsaturated dienophilic compounds (3), having an olefinic double bond and/or triple bond equivalence greater than 2, the following types of compound are especially suitable:

(a) Unsaturated polyesters from unsaturated dicarboxlic or polycarboxylic acids and diols or polyols which may be modified with saturated dicarboxylic or polycarboxylic acids. As unsaturated polycarboxylic acids, from which such polyesters are derived, there may be mentioned: Maleic, fumaric, mesaconic, citraconic, itaconic, tetrahydrophthalic and aconitic acid.

As diols or polyols, from which such unsaturated polyesters may be derived, there may be mentioned: Ethyleneglycol, diethyleneglycol, triethyleneglycol, propyleneglycol-1:2, propyleneglycol-1:3, butanediol-1:4, 2-methyl-pentanediol-2:4, pentanediol-1:5, hexanediol-1:6, bis-$\beta$-hydroxyethyl ether of bisphenol A [2:2'-bis(para-hydroxyphenyl)-propane] or of tetrachloro-bisphenol A; glycerol, diglycerol, trimethylolethane, trimethylolpropane, butanetriol-(1:2:4); hexanetriol, pentaerythritol, and pentachlorophenylglycerol ether.

As saturated dicarboxylic or polycarboxylic acids, which may optionally be further used to modify the unsaturated polyesters, there may be mentioned, for example: Succinic, glutaric, adipic, pimelic, suberic, azelaic, sebacic, hexahydrophthalic, tricarballylic acid; furthermore phthalic, isophthalic, terephthalic, 2:6-naphthalenedicarboxylic, diphenyl-ortho:ortho'-dicarboxylic acid, ethyleneglycol-bis-(para-carboxyphenyl)-ether, tetrachlorophthalic acid, hexachloro-endomethylene tetrahydrophthalic acid and tetrachlorosuccinic acid.

(b) Unsaturated polyesters from unsaturated dialcohols or polyalcohols and unsaturated dicarboxylic or polycarboxylic acids which may be modified by saturated dialcohols or polyalcohols and/or saturated dicarboxylic or polycarboxylic acids. As unsaturated polyols from which such polyesters are derived there may be mentioned:

1:6-bis(hydroxymethyl)2:5-endomethylene-cyclohexene-(3),
1:1-bis(hydroxymethyl)cyclohexene-3, and
1:1-bis(hydroxymethyl)-6-methyl-cyclohexene-(3).

As unsaturated polycarboxylic acids and possibly concomitantly used saturated polycarboxylic acids and saturated polyalcohols there may be used for the synthesis of the unsaturated polyesters defined under (b) the same compounds as those for the unsaturated polyesters under (a).

(c) Esters from a monobasic unsaturated monocarboxylic acid, such as acrylic, methacrylic, crotonic, cinnamic, furfurylacrylic, oleic, linoleic, ricinolic, soybean fatty acid or tall oil acids, with trihydric or polyhydric alcohols, such as glycerol trimethylolpropane, pentaerythritol, hydroxyethylated or hydroxypropylated novolaks, or polyglycerol ethers of polyphenols. As examples there may be mentioned: Glycerol-triacrylate, glycerol-tris-oleate and natural vegetable or animal unsaturated oils, such as linseed, tung or trane oil.

(d) Esters from unsaturated dicarboxylic or polycarboxylic acids, such as maleic, fumaric or itaconic acid, and unsaturated monohydric alcohols, such as allyl alcohol or crotyl alcohol. As examples there may be mentioned diallyl maleate and dicrotyl maleate.

(e) Ethers from unsaturated monohydric alcohols, such as allyl alcohol or crotyl alcohol and compounds containing three or more hydroxyl groups, such as glycerol, pentaerythritol, methylolmelamines or cyanuric acid. As examples there may be mentioned the hexamethylolmelamine pentaallyl ether, a transetherification product whose molecule contains on an average more than 2 allyl-hydroxy-ethyl groups, obtained from hexamethylolmelamine hexamethyl ether and ethyleneglycol mono-allyl ether, or triallyl cyanurate.

(f) Polymers and copolymers from dienes, such as butadiene or isoprene, whose molecule contains on an average more than 2 carbon-to-carbon double bonds. Particularly suitable relevant copolymers are those of butadiene or isoprene with ethylene, propylene, styrene, acrylonitrile or acrylic acid esters, such as ethyl acrylate or butyl acrylate. Compounds belonging to this class are, for example, solution polymers consisting of 80% by weight of butadiene and 20% by weight of styrene or methylstyrene (marketed under the registered trademark "Buton Resins").

(g) Compounds derived from carboxylic acids containing a carbon-to-carbon triple bond, such as propargylic acid or acetylenedicarboxylic acid, and whose molecule contains on an average in all more than 2 carbon-to-carbon double and triple bonds. As such compounds there are suitable, for example, esters of acetylenedicarboxylic acid with monohydric unsaturated alcohols, for example diallyl-acetylene-dicarboxylate; also esters of propargylic acid with at least trihydric alcohols, for example glycerol-tris-propargylate; finally unsaturated polyesters derived from acetylene-dicarboxylic acid and the diols or polyols listed under (a) and, if desired, other unsaturated and/or saturated dicarboxylic or polycarboxylic acids mentioned under (a).

The curable mixtures of the invention may further contain other known curing agents for epoxy resins, for example aromatic polyamines, such as bis(para-amino-phenyl)-methane or bis (para-aminophenylsulfone); amides such as dicyandiamide; polybasic carboxylic acids and anhydrides thereof, for example phthalic acid, phthalic anhydride, methyl-endomethylene tetrahydrophthalic anhydride, succinic anhydride, dodecenylsuccinic anhydride, maleic anhydride, hexahydrophthalic anhydride, hexachloro-endomethylene tetra-hydrophthalic anhydride, endomethylene tetrahydrophthalic anhydride or mixtures thereof. In some cases it is possible to use concomitantly curing accelerators; suitable relevant accelerators are tertiary amines, such as benzyl-trimethylamine or tris(dimethylaminomethyl)phenol, quaternary ammonium compounds, such as benzyl trimethyl ammonium phenate, strong Lewis bases, for example alkali metal alcoholates, also polyhydroxy compounds, such as hexanetriol or glycerol.

The curable mixtures may further contain known flexibilizers for epoxy resins, such as saturated polyesters, for example those obtained from polyalcohols such as ethyleneglycol or glycerol and saturated dicarboxylic acids, such as adipic or sebacic acid; or they may contain polyalkyleneglycols, such as polyethyleneglycols or propyleneglycols.

Furthermore, the curable mixtures of the invention may be mixed at any stage prior to the curing operation with fillers, plasticizers, pigments, dyestuffs, flame-inhibitors, mould lubricants or the like. Suitable extenders and fillers are, for example, asphalt, bitumen, glass fibers, mica, quartz meal, cellulose, kaolin, ground dolomite, colloidal silica having a large specific surface (Aerosil) or metal powders, such as aluminum powder.

The curable mixtures may be used in the unfilled or filled state, if desired in the form of solutions or emulsions, as laminating resins, paints, lacquers, dipping resins, casting resins, moulding compositions, coating compositions, pore fillers, floor coverings, potting and insulating compounds for the electrical industry, adhesives and the like, and also in the manufacture of such products.

Parts and percentages in the following examples are by weight, the relationship between part by weight and part by volume being the same as that between the kilogram and the liter.

*Example 1.—Curing an epoxy resin with a tetracarboxylic dianhydride of the following structural formula:*

(A)

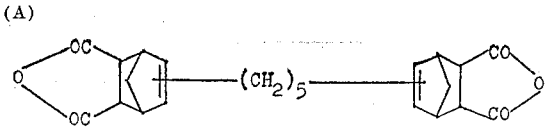

100 parts of an epoxy resin which is liquid at room temperature and contains 5.3 epoxide equivalents per kg., obtained by reacting bis(4-hydroxyphenyl)-dimethylmethane with epichlorohydrin in the presence of alkali, are mixed with 94 parts of a Diels-Alder adduct from 1:5-bis(cyclopentadienyl)pentane and maleic anhydride of the Formula A and cast in aluminum moulds (140 x 40 x 10 mm.).

The cured castings have the following properties:

| | Curing conditions | |
|---|---|---|
| | 24 hrs. at 140° C. | 12 hrs. at 140° C. and then 24 hrs. at 200° C. |
| Flexural strength kg./mm².  | 6.9 | 5.5 |
| Impact strength cm.kg./cm². | 2.8 | 2.9 |
| Modulus of elasticity kg./mm². | 428 | 415 |
| Heat distortion point accdg. to Martens (DIN), °C. | 111 | 154 |

The above casting resin mixture may also be used for cementing, for example metals, in the following manner:

Aluminum sheets marketed under the registered trade mark "Anticorodal B" (170 x 25 x 1.5 mm.; overlap 10 mm.) are coated at 100° C. with the resin mixture, clamped and cured for 5 hours at 180° C. When the shear strength of the resulting bond was measured at room temperature, it was found to be 1.72 kg./mm.².

The dianhydride of the Formula A used in this example was manufactured in the following manner:

92 parts of sodium are melted in 500 parts of xylene and finely dispersed. The whole is allowed to settle and the supernatant xylene is then decanted. 875 parts of anhydrous tetrahydrofuran, 20 parts of tertiary butanol and 1.5 parts of tertiary butylcatechol are added, and 277 parts of cyclopentadiene are stirred in at 20 to 25° C. while cooling externally. When the absorption of hydrogen has ceased, 430 parts of 1:5-dibromopentane are stirred in at 0° to 5° C. while cooling externally. The sodium bromide formed is filtered off and washed with 250 parts of tetrahydrofuran. The filtrate is introduced at 20 to 25° C. into a previously prepared solution of 366 parts of maleic anhydride in 366 parts of tetrahydrofuran, and the mixture is stirred for 16 hours at room temperature. The solution is evaporated under 15 mm. Hg pressure and finally heated for 1 hour at 150° C. under 16 mm. Hg pressure; yield: 699 parts (=94.5% of the theoretical) of a brownish, viscous resin.

| | Calculated | Found |
|---|---|---|
| Analysis.—$C_{23}H_{24}O_6$: | | |
| Percent C | 69.68 | 69.22 |
| Percent H | 6.10 | 6.11 |
| Equivalents of anhydride groups per kg | 5.05 | 4.80 |
| Molecular weight | 396 | 409 |

*Example 2.—Curing a liquid epoxy resin with a tetracarboxylic acid dianhydride of the following structural formula:*

(B)

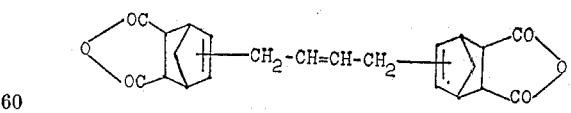

An epoxy resin which is liquid at room temperature and contains 5.3 epoxide equivalents per kg., prepared by reacting bis(4-hydroxyphenyl)-dimethylmethane with epichlorohydrin in the presence of alkali, is fused at 120° C. in a first test with 0.85 equivalent per equivalent epoxide of the dianhydride of the Formula B having an anhydride content of 4.91 anhydride equivalents per kg., and in a second test with 0.85 equivalent per equivalent of epoxide of the methylendomethylene tetrahydrophthalic anhydride which is a known curing agent.

The casting resin mixtures prepared in this manner are cast at 120° C. in aluminum moulds (140 x 40 x 10 mm.) and cured for 24 hours at 200° and, respectively, 240° C.

| Test | Heat distortion point according to Martens (DIN) in ° C. after having been cured for— ||
| --- | --- | --- |
| | 24 hrs. at 140° C. and then for 24 hrs. at 200° C. | 24 hrs. at 140° C. and then for 24 hrs. at 240° C. |
| 1 | 192 | 240 |
| 2 | 130 | 162 |

After an accelerated aging test (that is to say after having been stored for 17 days at 60° C.) the casting resin mixture used above is still suitable for casting; the casting temperature is 110–120° C.

The tetracarboxylic acid dianhydride of the Formula B used in this example was obtained by reacting 1 mol of 1:4-bis(cyclopentadienyl)-butene-(2) with 2 mols of maleic anhydride in the following manner:

276 parts of sodium are melted under 2080 parts of xylene and finely dispersed. The mixture is cooled and 35.5 parts of tertiary butanol are added. While cooling externally, 872 parts of monomeric cyclopentadiene are stirred in at 45° C. When hydrogen is no longer being evolved, 738 parts of 1:4-dichlorobutene-(2) are stirred at 30–35° C. into the mixture which is externally cooled. Titration of the alkalinity reveals that a quantitative reaction has taken place. The sodium chloride formed is filtered off and washed with 5 x 400 parts of xylene. The filtrate contains the intermediately formed 1:4-bis-(cyclopentadienyl)-butene-(2).

While cooling the filtrate externally, 1040 parts of maleic anhydride are stirred in portionwise, and the whole is then heated for 2 hours at 80–90 C.; the solvent is evaporated under vacuum and the residue is heated for 2 hours longer at 130–140° C. under a pressure of 0.3 mm. Hg, to yield 1831 parts (=81.7% of the theoretical yield, calculated from 1:4-dichlorobutene) of a light-brown, viscid resin.

| | Calculated | Found |
| --- | --- | --- |
| Analysis.—$C_{22}H_{20}O_6$: | | |
| Percent C | 69.46 | 69.48 |
| Percent H | 5.30 | 5.30 |
| Equivalents of anhydride groups per kg | 5.25 | 4.91 |

*Example 3.—Curing a liquid cycloaliphatic epoxy resin with a tetracarboxylic acid dianhydride of the Formula B described in Example 2*

An epoxy resin which is liquid at room temperature and contains 6.23 epoxide equivalents per kg., prepared by diepoxidation of an acetal from $\Delta^3$-tetrahydrobenzaldehyde and 3-cyclohexene-1:1-dimethanol (obtained as described in Example 1 of French Patent No. 1,233,231, issued May 2, 1960, to Ciba Societe Anonyme) is melted at 120° C. in a first test with 0.40 equivalent per equivalent of epoxide of the dianhydride of the Formula B having a dianhydride content of 4.91 anhydride equivalents per kg., and in a second test with 0.40 equivalent per equivalent of epoxide of methyl-endomethylene tetrahydrophthalic anhydride which is known as a curing agent. From the casting resin mixtures thus prepared castings are made as described in Example 1.

| Test | Heat distortion point according to Martens (DIN) in ° C. after having been heated for 24 hours at 140° C. and the for 24 hours at 200° C. |
| --- | --- |
| 1 | 203 |
| 2 | 155 |

*Example 4.—Curing a liquid epoxy resin with a tetracarboxylic acid dianhydride of the following structural formula:*

(C)

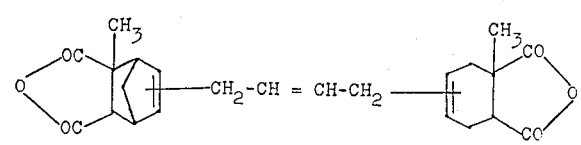

100 parts of the epoxy resin used in Example 1, which is liquid at room temperature and contains 5.3 epoxide equivalents per kg., prepared by reacting bis(4-hydroxyphenyl)-dimethylmethane with epichlorohydrin in the presence of alkali, are fused at 120° with 96.2 parts of the dianhydride of the formula C and with 1 part of 2:4:6-tris-(dimethylaminomethyl)phenol. From the casting resin mixture obtained in this manner castings are made as described in Example 1. The castings are cured for 24 hours at 90° C. and then for 24 hours at 180° C., whereupon they display the following properties:

Flexural strength, kg./mm.² _____ 5.7
Impact strength, cm.kg./cm.² _____ 2.0
Heat distortion point accdg. to Martens (DIN), ° C._ 138

The dianhydride of the Formula C was prepared in the following manner:

A solution of 184 parts of 1:4-bis(cyclopentadienyl)-butene-(2) in 600 parts of xylene is introduced at 20–50° C. into 224 parts of citraconic anhydride. The clear, light-yellow solution is heated to 100° C. and maintained for one hour at this temperature. The solvent is then evaporated under 14 mm. Hg pressure and the residue is heated for ½ hour longer at 100° C. under 0.1 mm. Hg pressure; yield: 383 parts (=94% of the theoretical) of a yellowish brown, viscous oil.

| | Calculated | Found |
| --- | --- | --- |
| Analysis.—$C_{24}H_{24}O_6$: | | |
| Percent C | 70.57 | 70.48 |
| Percent H | 5.92 | 5.96 |
| Equivalents of anhydride groups per kg | 4.90 | 4.66 |

*Example 5.—Curing an epoxy resin with a tetracarboxylic acid anhydride of the following structural formula:*

(D)

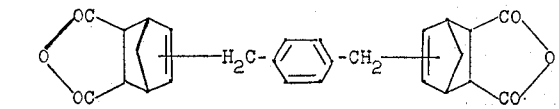

100 parts of an epoxy resin which is liquid at room temperature and contains 5.3 epoxide equivalents per kg., prepared by reacting bis(4-hydroxyphenyl)-dimethylmethane with epichlorohydrin in the presence of alkali, are fused with 101.5 parts of a Diels-Alder adduct from para-xylylene-bis(cyclopentadiene) and maleic anhydride and then cast at 140° C. in aluminum moulds. The castings, cured under the under-mentioned conditions, display the following properties:

| | Curing conditions ||
| --- | --- | --- |
| | 24 hrs. at 140° C. and then for 24 hrs. at 180° C. | 24 hrs. at 140° C. and then for 24 hrs. at 200° C. |
| Flexural strength kg./mm² | 6.2 | 6.9 |
| Impact strength cm. kg./cm² | 5.0 | 3.5 |
| Heat distortion point accdg. to Martens (DIN), ° C | 102 | 113 |

The Diels-Alder adduct of the Formula D used in this example was prepared as follows:

42.8 parts of potassium are melted in 610 parts of benzene and then finely dispersed with a mechanical stirrer. 78 parts of cyclopentadiene in 283 parts of benzene are then stirred at 18° C. into the externally cooled batch. The suspension is diluted with 568 parts of benzene, and a solution of 132 parts of para-xylylene dibromide in 465 parts of benzene and 680 parts of ethyleneglycol diethyl ether are stirred at 12–17° C. into the externally cooled batch. The potassium bromide formed is filtered off and rinsed with 3 x 300 parts of benzene. 79.4 parts of maleic anhydride and 0.26 part of phenyl-$\beta$-naphthylamine are introduced portionwise into the filtrate at 20° C. The solution is first slightly turbid and becomes clear when it is heated to 80° C.; it is maintained for one hour at this temperature and the solvent is then evaporated under vacuum. Finally, the reaction mixture is heated for 1 hour under 0.5 mm. Hg pressure at 90° C., to yield 185.5 parts (=86% of the theoretical yield, calculated from para-xylylene dibromide) of a dark-colored, solid resin which has a softening point of 48° C. (determined on a Kofler heater).

|  | Calculated | Found |
|---|---|---|
| Analysis.—$C_{26}H_{22}O_6$: |  |  |
| Percent C | 72.54 | 71.71 |
| Percent H | 5.15 | 5.28 |
| Equivalents of anhydride groups per kg | 4.65 | 4.43 |

*Example 6.—Curing an epoxy resin with a tetracarboxylic acid dianhydride of the following structural formula:*

(E)

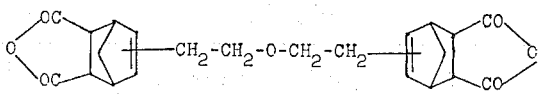

100 parts of the epoxy resin used in Example 1, which is liquid at room temperature and contains 5.3 epoxide equivalents per kg., obtained by reacting bis(4-hydroxyphenyl)-dimethylmethane with epichlorohydrin in the presence of alkali, are mixed at 100° C. with 97 parts of a Diels-Alder adduct from 2:2'-bis(cyclopentadienyl)-diethyl ether and maleic anhydride of the Formula E and poured into aluminum moulds. After having been cured for 24 hours at 140° C. and then for 24 hours at 200° C., the resulting castings display the following properties:

Flexural strength, kg./mm.$^2$ _____ 4.7
Impact strength, cm. kg./cm.$^2$ _____ 2.6
Heat distortion point accdg. to Martens (DIN) ° C. _____ 201

The Diels-Alder adduct of the Formula E used above was prepared thus:

18.4 parts of sodium are fused in 50 parts of xylene and then finely dispersed. 140 parts of tetrahydrofuran, 2.4 parts of tertiary butanol and 0.1 part of phenyl-$\beta$-naphthylamine are added, and 55.5 parts of cyclopentadiene are stirred at 46–49° C. into the externally cooled batch. While cooling externally, 56 parts of bis(2-chloroethyl) ether are then stirred in dropwise at 25° C. The batch is stirred for 3 hours longer at 25° C., neutralized with 7.2 parts of glacial acetic acid, and the solvent is evaporated under vacuum. 200 parts of ice water are added and the mixture is extracted with 300 parts of ether. The ethereal solution is dried with 100 parts of sodium sulfate, filtered and concentrated to half its volume under vacuum. The solution is added to a mixture of 70.5 parts of maleic anhydride and 45 parts of ether while being slightly refluxed. The solvent is evaporated under vacuum. Finally, the batch is heated for 1 hour at 90° C. under 0.5 mm. Hg pressure, to yield 119 parts (=75% of the theoretical yield) of a viscid resin.

*Analysis.*—$C_{22}H_{22}O_7$, equivalents of anhydride groups per kg., calculated: 5.03. Found: 4.66.

*Example 7.—Curing an epoxy resin with a Diels-Alder adduct from bis(cyclopentadienylpentenyl)ethers and maleic anhydride*

100 parts of the epoxy resin described in Example 1 are mixed at 120° C. with 117 parts of a Diels-Alder adduct from bis(cyclopentadienylpentenyl)ethers and maleic anhydride and the casting resin mixture obtained is cast in aluminum moulds as described in Example 1. After having been cured at the undermentioned conditions, the resulting castings have the following properties:

|  | Curing conditions | |
|---|---|---|
|  | 24 hrs. at 140° C. and then 24 hrs. at 180° C. | 24 hrs. at 140° C. and then 24 hrs. at 200° C. |
| Flexural strength | 5.9 | 4.9 |
| Impact strength | 2.8 | 4.0 |
| Heat distortion point accdg. to Martens (DIN), ° C | 111 | 117 |

The Diels-Alder adduct used in the above example was prepared in the following manner:

23 parts of sodium are melted in 70 parts of xylene and finely dispersed. After the sodium has settled, the supernatant xylene is decanted and replaced by 160 parts of anhydrous tetrahydrofuran. 3 parts of tertiary butanol and 0.1 part of phenyl-$\beta$-naphthylamine are then added. While cooling the batch externally, 72.6 parts of cyclopentadiene are then stirred in at 40–45° C. When hydrogen is no longer being evolved, 96 parts of mixture of isomers of bis(chloropentenyl)ethers [boiling at 79–88° C. under 0.15 mm. Hg pressure] are then dropped in at 0° C. The batch is stirred for 16 hours longer at 5–10° C. and neutralized with 13.3 parts of glacial acetic acid. The solvent is evaporated under vacuum, and the residue is mixed with 300 parts of ice-water and extracted with 3 x 200 parts of ether. The ethereal extracts are combined, dried with 120 parts of sodium sulfate and filtered. The filtrate is concentrated under vacuum to 300 parts and poured at 15–25° C. into a mixture of 72.3 parts of maleic anhydride and 50 parts of ether. The whole is heated for 2 hours at 37–41° C. and the solvent is then evaporated under vacuum. Finally, the mixture is heated for 3 hours at 90° C. under 0.6 mm. Hg pressure. Yield: 149 parts of a viscid, dark-brown resin.

*Analysis.*—$C_{28}H_{30}O_6$, equivalents of anhydride groups per kg., calculated: 4.33. Found: 3.86.

The mixture of isomers of the bis(chloropentenyl)ethers can be prepared from 1 mol of symmetrical dichlorodimethyl ether and 2 mols of butadiene as described in German Patent No. 862,154, issued January 8, 1953, to Rohm & Haas Company, Philadelphia, U.S.A.

*Example 8.—Curing a liquid epoxy resin with an octacarboxylic acid tetranhydride of the following structural formula:*

(F)

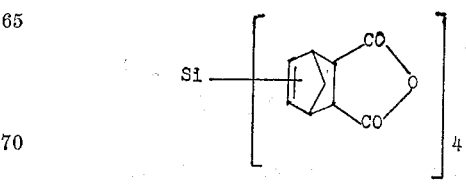

100 parts of the epoxy resin used in Example 1, which is liquid at room temperature and contains 5.3 epoxide equivalents per kg., prepared by reacting bis(4-hydroxyphenyl)dimethylmethane with epichlorohydrin in the presence of alkali, are fused at 120° C. with 72.7 parts of the tetraanhydride of the Formula F and with 1.7 parts of 2:4:6 - tris(dimethylaminomethyl)phenol. Castings are then made from the casting resin mixture thus prepared in the manner described in Example 1.

After having been cured for 15 hours at 100° C. and then for 24 hours at 200° C., the castings display the following properties:

| | |
|---|---|
| Flexural strength, kg./mm.$^2$ | 3.0 |
| Impact strength, cm. kg./cm.$^2$ | 1.8 |
| Heat distortion point accdg. to Martens (DIN), ° C. | 153 |
| Water absorption (1 hour at 100° C.), percent | 0.22 |
| Modulus of elasticity kg./mm.$^2$ | 518 |

The tetraanhydride of the Formula F used in this example was prepared in the following manner:

267 parts of silicon tetrachloride are stirred within 40 minutes at 10–20° C. into an externally cooled suspension of cyclopentadienyl sodium (prepared as in Example 2 from 1050 parts of xylene, 145 parts of sodium, 25 parts of tertiary butanol and 446 parts of cyclopentadiene). The reaction mixture is heated on for 2 hours at 17° C., then neutralized with 80 parts of glacial acetic acid, filtered off from the sodium chloride formed and washed with xylene. With external cooling and stirring the filtrate [which contains the intermediately formed tetrakis(cyclopentadienyl)silane] is introduced at 60° C. in 606 parts of molten maleic anhydride, whereupon a precipitate is gradually formed. The batch is heated to 100–110° C. and this temperature is maintained for 2 hours. The resinous precipitate is isolated and extracted at 125° C. with 900 parts of xylene. The extract is added to the main product and the solvent is removed at 100° C. under 15 mm. Hg pressure. Yield: 686 parts (=64% of theoretical) of a brown, solid resin.

*Analysis.*—Equivalents of anhydride groups per kg., calculated: 5.88. Found: 6.17.

*Example 9.—Curing a liquid epoxy resin with a tetraanhydride of the Formula F as described in Example 8*

100 parts of the epoxy resin used in Example 3, which is liquid at room temperature, are mixed at 125° C. with 45.2 parts of the tetraanhydride of the Formula F, which has been prepared as described in Example 8, and the mixture is poured into an aluminum mould. After having been cured for 12 hours at 100° C., then for 6 hours at 150° C. and finally for 24 hours at 200° C., the castings thus obtained have a heat distortion point according to Martens (DIN) of 212° C.

When the above casting resin mixture is used for cementing aluminum sheets as described in Example 1, the cemented sheets being cured for 5 hours at 180° C., the shear strength of the resulting bond is found to be 0.88 kg./mm.$^2$.

*Example 10.—Curing a liquid epoxy resin with a tetracarboxylic acid dianhydride of the following structural formula:*

(G)

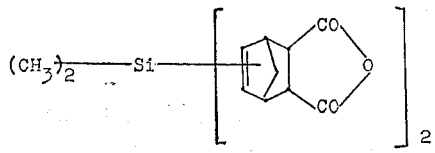

100 parts of the epoxy resin used in Example 1, which is liquid at room temperature and contains 5.3 epoxide equivalent per kg., obtained by reacting bis(4-hydroxyphenyl)-dimethylmethane with epichlorohydrin in the presence of alkali, are fused at 120° C. with 90 parts of the dianhydride of the Formula G and 1.9 parts of 2:4:6-tris(dimethylaminomethyl)phenol. Castings are made from the resulting castiny resin mixture as described in Example 1 which, after having been cured for 15 hours at 100° C. and then for 24 hours at 200° C., display the following properties:

| | |
|---|---|
| Flexural strength, kg./mm.$^2$ | 5.4 |
| Impact strength, cm. kg./cm.$^2$ | 2.6 |
| Heat distortion point accdg. to Martens (DIN), ° C. | 140 |
| Modulus of elasticity, kg./mm.$^2$ | 407 |
| Water absorption (1 hour at 100° C.) percent | 0.21 |

The dianhydride of the Formula G used in the above example was prepared in the following manner:

387 parts of dimethyldichlorosilane are stirred within 100 minutes at 0° C. into an externally cooled suspension of cyclopentadienyl sodium (prepared as described in Example 2 from 1050 parts of xylene, 138 parts of sodium, 24 parts of tertiary butanol and 436 parts of cyclopentadiene) and the whole is stirred on for 3 hours at 0° C. With provision of strong external cooling, 1250 parts of ice-water are run in, and the aqueous layer is separated in a separating funnel. The organic layer is dried with 150 parts of calcium chloride and the calcium chloride is then filtered off. The filtrate is mixed at 20–30° C. with 588 parts of maleic anhydride added in small portions, during which slight external cooling is necessary. The clear solution is heated to 100° C. and maintained at this temperature for 2 hours. After having evaporated the solvent at 100° C. under 15 mm. Hg pressure, there are obtained 964 parts (=83.6% of the theoretical yield) of a brown, highly viscous resin.

| | Calculated | Found |
|---|---|---|
| Analysis.—C$_{20}$H$_{20}$O$_6$Si: | | |
| Percent Si | 7.3 | 6.5 |
| Equivalents of anhydride groups per kg. | 5.21 | 4.60 |

*Example 11.—Curing a liquid epoxy resin with the dianhydride of the Formula G described in Example 10*

100 parts of the epoxy resin used in Example 3, which is liquid at room temperature, are mixed at 80° C. with 60.7 parts of the dianhydride of the Formula G, prepared as described in Example 10, and the mixture is poured into an aluminum mould. After having been cured for 12 hours at 100° C., then for 6 hours at 150 and finally for 24 hours at 200° C., the resulting castings have the following properties:

| | |
|---|---|
| Flexural strength, kg./mm.$^2$ | 3.5 |
| Impact strength, cm. kg./cm.$^2$ | 2.4 |
| Modulus of elasticity, kg./mm.$^2$ | 659 |
| Heat distortion point accdg. to Martens (DIN), ° C. | 182 |

When the above casting resin mixture is used for cementing aluminum sheets as described in Example 1 and curing is performed for 5 hours at 180° C., the resulting bond has a shear strength of 0.85 kg./mm.$^2$.

*Example 12.—Curing a liquid epoxy resin with an octacarboxylic acid tetraanhydride of the following structural formula:*

(H)

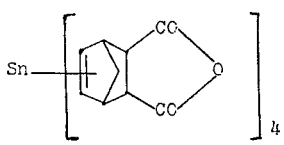

100 parts of the epoxy resin used in Example 1, which is liquid at room temperature and contains 5.3 epoxide equivalents per kg., prepared by reacting bis(4-hydroxyphenyl)-dimethylmethane with epichlorohydrin in the presence of alkali, are melted at 160° C. together with 64.3 parts of the tetraanhydride of the Formula H and 19.7 parts of methyl-endomethylene tetrahydrophthalic anhydride, and the melt is poured into aluminum moulds.

After having been cured for 12 hours at 100° C., then for 21 hours at 150° C. and finally for 24 hours at 200° C., the resulting castings display the following properties:

Flexural strength, kg./mm.$^2$ _____ 2.2
Impact strength, cm. kg./cm.$^2$ _____ 1.4
Modulus of elasticity, kg./mm.$^2$ _____ 555
Heat distortion point accdg. to Martens (DIN), ° C. _ 132
Water absorption (4 days at 20° C.), percent _____ 0.41

When the above casting resin mixture is used for cementing aluminum sheets as described in Example 1 and the sandwiches are cured for 5 hours at 180° C., the resulting bond has a shear strength of 0.92 kg./mm.$^2$.

The tetraanhydride of the Formula H used in the above example was prepared in the following manner:

260 parts of tin tetrachloride in 260 parts of xylene are stirred at 0-5° C. within 50 minutes into an externally cooled suspension of cyclopentadienyl sodium (prepared as described in Example 2 from 875 parts of xylene, 115 parts of sodium, 20 parts of tertiary butanol, 1.5 parts of tertiary butylcatechol and 396 parts of cyclopentadiene); the mixture is maintained for 1 hour longer at 0° C., then mixed with 80 parts of methanol and stirred into 1000 parts of ice-water. The mixture is adjusted with 16.8 parts of glacial acetic acid to pH=6, and the organic layer is separated and dried with 100 parts of anhydrous sodium sulfate. Within a temperature range of 25-40° C., 392 parts of maleic anhydride are added in small portions while cooling externally. The batch is heated to 125° C. and maintained at this temperature for 1½ hours. The tetraanhydride of the Formula H thus formed is filtered off, washed with 150 parts of petroleum ether and dried at 60° C. in a vacuum drying cabinet until the weight remains constant. Yield: 634 parts (=82.3% of the theoretical) of a faintly white powder which decomposes at about 310° C.

*Analysis.*—$C_{36}H_{28}O_{12}Sn$ calculated: percent C, 56.10; percent H, 3.56. Found: percent C, 56.57; percent H, 3.76.

*Example 13.—Curing a mixture of an unsaturated polyester and a liquid epoxy resin with a Diels-Alder adduct from 1:4-bis(cyclopentadienyl)-butene-(2) and maleic anhydride*

80.9 parts of the unsaturated polyester described below, 19.1 parts of the liquid epoxy resin used in Example 1 and 36.6 parts of the Diels-Alder adduct from 1:4-bis-(cyclopentadienyl)-butene-(2) and maleic acid described below are mixed at 100° C. and cast in aluminum moulds as described in Example 1. After having been cured for 24 hours at 140° C. and then for 24 hours at 180° C., the resulting castings display the following properties:

Flexural strength, kg./mm.$^2$ _____ 16.2
Impact strength, cm. kg./cm.$^2$ _____ 10.5
Modulus of elasticity, kg./mm.$^2$ _____ 622
Heat distortion point accdg. to Martens (DIN), ° C. _ 91

The above casting resin mixture is also suitable for cementing aluminum sheets as described in Example 1. After curing for 24 hours at 140° C. and then for 24 hours at 180° C., the resulting bond displays a shear strength of 1.40 kg./mm.$^2$.

The unsaturated polyester used in the above example was prepared in the following manner:

A mixture of 1245 parts of isophthalic acid, 222 parts of phthalic anhydride and 1435 parts of 1:2-propyleneglycol is esterified under nitrogen at 180–210° C., while distilling off the water of reaction formed, in an apparatus equipped with a column and a descending condenser until the acid number has dropped below 5. 881 parts of maleic anhydride are then added and the batch is esterified at 200–220° C. to an acid number of 25, to yield 3300 parts of a solid resin softening at 65° C. (on a Kofler heater); it contains 2.74 double bond equivalents per kg. and has an average molecular weight of 1930.

The Diels-Alder adduct from 1:4-bis(cyclopentadienyl)-butene-(2) and maleic anhydride used in the above example was prepared in the following manner:

40 parts of maleic anhydride are added in small portions at 30 to 50° C. to a solution in xylene of 1:4-bis-(cyclopentadienyl)-butene-(2) which has been prepared as has been described for the product of the Formula B in Example 2, from 46 parts of sodium, 345 parts of xylene, 5.9 parts of tertiary butanol and 0.1 part of phenyl-β-naphthylamine, 145 parts of cyclopentadiene and 119 parts of 1:4-dichlorobutene-(2). The temperature is then raised and kept for 3 hours at 100–120° C. The solvent is distilled off under vacuum and the residue is heated on for 1 hour at 100° C. under 0.1 mm. Hg pressure, to yield 157 parts of a viscous, brown oil.

*Analysis.*—2.35 equivalents of anhydride groups per kg.

*Example 14.—Curing a mixture of an unsaturated polyester and a liquid epoxy resin with a Diels-Alder adduct from 1:4-bis(cyclopentadienyl)-butene-(2) and maleic anhydride*

72.5 parts of the unsaturated polyester used in Example 13, 27.5 parts of the liquid epoxy resin used in Example 3 and 32.8 parts of the Diels-Alder adduct from 1:4-bis(cyclopentadienyl)-butene-(2) and maleic anhydride described in Example 13 are mixed at 100° C. and poured into aluminum moulds as described in Example 1.

After having been cured for 24 hours at 140° C. and then for 24 hours at 180° C., the resulting castings display the following properties:

Flexural strength, kg./mm.$^2$ _____ 11.7
Impact strength, cm. kg./cm.$^2$ _____ 12.2
Modulus of elasticity, kg./mm.$^2$ _____ 652
Heat distortion point accdg. to Martens (DIN), ° C. _____ 116

The above casting resin mixture is also suitable for cementing aluminum sheets as described in Example 1. After having been cured for 24 hours at 140° C. and then for 24 hours at 180° C., the resulting bond displays a shear strength of 1.10 kg./mm.$^2$.

*Example 15.—Curing of maleic acid di(epoxy-tricyclodecenyl)ester with a Diels-Alder adduct from 1:4-bis-(cyclopentadienyl)-butene-(2) and maleic acid anhydride*

100 parts of maleic acid di(epoxy-tricyclodecenyl)-ester, containing 4.57 epoxide equivalents per kg. and 2.43 double bond equivalents per kg. (prepared as described in Example 2 of Belgian Patent No. 602,175) and 131 parts of the Diels-Alder adduct from 1:4-bis-(cyclopentadienyl)-butene-(2) and maleic anhydride described in Example 13 are mixed at 80° C. and cast in aluminum moulds as described in Example 1. After having been cured for 24 hours at 140° C. and then for 24 hours at 180° C., the resulting castings display a heat distortion point according to Martens (DIN) of 170° C.

*Example 16.—Curing a xylylpolybutene epoxide with a Diels-Alder adduct from 1:4-bis(cyclopentadienyl)-butene-(2) and maleic anhydride*

100 parts of the xylylpolybutene epoxide prepared as described below, which contains 5.5 epoxide equivalents per kg., are mixed at 80° C. with 160 parts of the Diels-Alder adduct from 1:4-bis(cyclopentadienyl)-butene-(2) and maleic anhydride described in Example 13, and the mixture is cast in aluminum moulds as described in Example 1.

After having been cured for 24 hours at 150° C. and then for 24 hours at 180° C., the resulting castings have the following properties:

Flexural strength, kg./mm.² _____ 4.0
Impact strength, cm. kg./cm.² _____ 2.5
Heat distortion point accdg. to Martens
  (DIN), ° C. _____ 104

The xylylbutene epoxide was prepared as follows:

318 parts of xylene are reacted with a total of 692 parts of butadiene in the presence of 2.5 parts of sodium metal and 2.5 parts of potassium metal under 5–10 mm. Hg superatmospheric pressure at 110–120° C., whereupon the reaction mixture is neutralized with a little water, methanol and acetic acid. After the sodium acetate and potassium acetate have been removed by centrifugation, there are obtained 976 parts of crude reaction product which is subjected to distillation.

The residue forming the main product [intermediate (a)] consists of 745 parts of polybutenylated xylene in the form of a yellowish to brownish oily liquid which has a viscosity of 74 centipoises and contains 12.0 double bond equivalents per kg. Its refractive index $n_D$ at 20° C. is 1.5184.

915 parts of the polybutenylated xylene described above, containing 12.0 double bonds per kg., are dissolved in 2800 parts of benzene, and 250 parts of formic acid of 85% strength and 500 parts of sodium sulfate are stirred in. Within 3 hours 525 parts of hydrogen peroxide of 85% strength are dropped in, and during this time the internal temperature is maintained at 28 to 30° C. by slight cooling in a water bath kept at about 25° C. After having removed the solvent under vacuum, there are obtained 1047 parts of an epoxy resin which contains 5.5 epoxide equivalents per kg., 2.3 double bond equivalents per kg. and 0.5 hydroxyl equivalent per kg. and has a viscosity of about 1000 centipoises at 25° C.

*Example 17.*—*Curing an acetal, having an epoxidized cyclohexene ring, from 3-cyclohexene-1:1-dimethanol and acrolein with a Diels-Alder adduct from 1:4-bis(cyclopentadienyl)-butene-(2) and maleic anhydride*

100 parts of the acetal, having an epoxidized cyclohexene ring, from 3-cyclohexene-1:1-dimethanol and acrolein, containing per kg. 4.76 epoxide equivalents and 5.05 double bond equivalents, are mixed at 120° C. with 100 parts of the Diels-Alder adduct from 1:4-bis(cyclopentadienyl)-butene-(2) and maleic acid described in Example 13, and the mixture is cast in aluminum moulds as described in Example 1.

After having been cured for 24 hours at 150° C. and then for 24 hours at 180° C., the resulting castings display the following properties:

Flexural strength, kg./mm.² _____ 5.5
Impact strength, cm. kg./cm.² _____ 2.7
Heat distortion point accdg. to Martens
  (DIN), ° C. _____ 101

*Example 18.*—*Curing a mixture of an unsaturated polyester and a liquid epoxy resin with a Diels-Alder adduct from 1:4-bis(cyclopentadienyl)-butene-(2) and citraconic anhydride*

62.2 parts of the unsaturated polyester used in Example 13, 37.8 parts of the epoxy resin used in Example 1, which is liquid at room temperature and contains 5.3 epoxide equivalents per kg. (prepared by reacting bis-(4-hydroxyphenyl)-dimethylmethane with epichlorohydrin the presence of alkali) and 50.4 parts of a Diels-Alder adduct from 1:4-bis(cyclopentadienyl)-butene-(2) and citraconic anhydride are mixed at 130° C. and the mixture is cast in aluminum moulds as described in Example 1.

After having been cured for 24 hours at 140° C. and then for 24 hours at 180° C., the resulting castings display the following properties:

Flexural strength, kg./mm.² _____ 14.6
Impact strength, cm. kg./cm.² _____ 8.5
Heat distortion point accdg. to Martens (DIN),
  ° C. _____ 96

The above casting resin mixture may also be used for cementing, for example metals. When aluminum sheets are cemented together as described in Example 1, and the sheets are then cured for 5 hours at 180° C., the bond so achieved has a shear strength of 3.17 kg./mm.².

The Diels-Alder adduct used in the above example was prepared in the following manner:

224 parts of citraconic anhydride are added at 20° C. to a solution of 368 parts of 1:4-bis(cyclopentadienyl)-butene-(2) in 1200 parts of xylene. The clear, yellow solution is slowly heated to 100° C. and maintained for 1 hour at 100–110° C. The solvent is evaporated under a pressure of 15 mm. Hg, and the residue is kept for 1 hour at 100° C. under 0.2 mm. Hg pressure, to yield 498 parts of a light-yellow, viscous liquid.

*Analysis.*—3.88 equivalents of anhydride groups per kg.

*Example 19.*—*Curing a mixture of an unsaturated polyester, an epoxy resin and a Diels-Alder adduct from 4:6 - bis-(cyclopentadienylmethyl)-1:3-dimethylbenzene and maleic anhydride*

Aluminum sheets are bonded as described in Example 1 with a mixture consisting of 76.6 parts of the unsaturated polyester obtained as described in Example 13, 23.4 parts of the epoxy resin used in Example 1, 0.23 part of 2:4:6-tris(dimethylaminomethyl)phenol and 37.2 parts of the Diels-Alder adduct from 4:6-bis(cyclopentadienylmethyl)-1:3-dimethylbenzene and maleic anhydride described below. After curing for 5 hours at 180° C. the resulting bond displays a shear strength of 3.03 kg./mm.². The mixture described above is also suitable for use as a casting resin, curing at 140 to 200° C. for 24–10 hours leading to infusible and insoluble castings.

The Diels-Alder adduct used in the above example was prepared in the following manner:

A solution of 193 parts of 4:6-dichloromethyl-1:3-dimethylbenzene in 350 parts of xylene and 50 parts of ethyleneglycol diethyl ether is stirred at 15–25° C. into an externally cooled suspension of cyclopentadienyl sodium [prepared as described in Example 2 from 345 parts of xylene, 46 parts of sodium, 5.9 parts of tertiary butanol, 0.2 part of phenyl-β-naphthylamine and 145 parts of cyclopentadiene], diluted with 100 parts of ethyleneglycol diethyl ether. The sodium chloride formed is filtered off and rinsed with 3 x 200 parts of xylene. The filtrate is stirred dropwise into 146 parts of fused maleic anhydride, and the temperature is kept at 80–90° C. for 2 hours. The solvent is evaporated under a pressure of 12 mm. Hg and the residue is heated for 1 hour at 95° C. under 0.5 mm. Hg pressure, to yield 283 parts of a brown, solid resin.

*Analysis.*—3.4 equivalents of anhydride groups per kg.

*Example 20.*—*Curing a mixture of an unsaturated polyester and a liquid epoxy resin with a Diels-Alder adduct from 4:6 - bis(cyclopentadienylmethyl)-1:3-dimethylbenzene and maleic anhydride*

76.6 parts of the unsaturated polyester used in Example 13, 23.4 parts of the liquid epoxy resin used in Example 1 and 30.9 parts of a Diels-Alder adduct from 4:6-bis-(cyclopentadienylmethyl)-1:3-dimethylbenzene and maleic anhydride are mixed at 120° C., degassed under vacuum, and then cast in aluminum moulds as described in Example 1.

After having been cured for 7 hours at 150° C. and then for 10 hours at 180° C. the resulting castings display the following properties:

Flexural strength, kg./mm.² _____ 13.4
Impact strength, cm. kg./cm.² _____ 9.6
Heat distortion point accdg. to Martens (DIN),
  ° C. _____ 59

Aluminum sheets cemented with the above casting resin mixture as described in Example 1 and cured for 10 hours at 180° C. display a shear strength of the bond of 3.0 kg./mm.²

The Diels-Alder adduct used in the above example was prepared as described in Example 19 except that instead of 146 only 76 parts of maleic anhydride were used; yield: 254 parts of a light-brown, solid resin.

Softening point: 73° C. (measured on a Kofler heater).

*Analysis.*—2.8 equivalents of anhydride groups per kg.

*Example 21.*—Curing a mixture of an unsaturated polyester and an epoxy resin with a Diels-Alder adduct from bis(cyclopentadienyl)-dimethylsilane and maleic acid anhydride 39.7 parts of the unsaturated polyester described below, containing 6.8 double bond equivalents per kg., 60.3 parts of the epoxy resin described in Example 1, which is liquid at room temperature and contains 5.3 epoxide equivalents per kg., prepared by reacting bis(4-hydroxyphenyl)-dimethylmethane with epichlorohydrin in the presence of alkali, are mixed at 60° C. with 100 parts of the Diels-Alder adduct described below from bis(cyclopentadienyl)-dimethylsilane and maleic anhydride and the mixture is poured into aluminum moulds. The resulting castings display the following properties after having been cured for 12 hours at 100° C., then for 6 hours at 150° C. and finally for 24 hours at 200° C.:

| | |
|---|---|
| Flexural strength, kg./mm.² | 6.2 |
| Impact strength, cm. kg./cm.² | 3.4 |
| Modulus of elasticity, kg./mm.² | 550 |
| Heat distortion point accdg. to Martens (DIN), ° C. | 113 |
| Water absorption (4 days at 20° C.), percent | 0.27 |

When aluminum sheets are cemented with the above casting resin mixture as described in Example 1 and cured for 5 hours at 180° C., the resulting bond has a shear strength of 2.32 kg./mm.²

The polyester used in the above example was prepared in the following manner:

A mixture of 1160 parts of fumaric acid, 682 parts of ethyleneglycol and 0.3 part of hydroquinone is esterified under nitrogen at 180–205° C. in an apparatus equipped with a column and a descending condenser, while distilling off the water of reaction formed. During the last 20 minutes of the esterification the reaction is conducted under a pressure descending from 100 to 18 mm. Hg; yield: 1475 parts (=99.3% of the theoretical) of a solid resin having an acid number of 23, containing 6.8 double bond equivalents per kg. and softening at 70° C. (measured on a Kofler heater).

The Diels-Alder adduct used in the above example was prepared in the following manner:

387 parts of dimethyldichlorosilane are stirred within 90 minutes at 0–10°C. with cooling into an externally cooled suspension of cyclopentadienyl sodium prepared as described in Example 2 from 1050 parts of xylene, 152 parts of sodium, 25 parts of tertiary butanol, 1.8 parts of tertiary butylcatechol and 455 parts of cyclopentadiene. The temperature is then maintained for 6 hours at 3 to 5° C.; the batch is then poured into 1200 parts of ice-water and 50 parts of glacial acetic acid, the aqueous layer is separated and the organic layer dried with 150 parts of anhydrous calcium chloride. The solution is filtered and 247 parts of maleic anhydride are added in small portions at 8 to 28° C. The solution is concentrated at 80° C. under vacuum to one third its volume. The resulting precipitate (a by-product softening at 134° C.; not subjected to further examination) is filtered off (dry weight: 100 parts). The filtrate is completely evaporated at 100 to 150° C. under 15 mm. Hg pressure and the residue is heated for 1 hour longer at 150° C. under 15 mm. Hg pressure. Yield: 775 parts (=90.3% of theory) of a brown, viscous resin.

*Analysis.*—2.72 equivalents of anhydride groups per kg.

*Example 22.*—Curing an epoxy resin with a tetrecarboxylic dianhydride of the following structural formula (J)

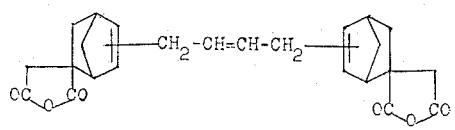

100 parts of the epoxy resin used in Example 1 and 93 parts of the dianhydride of the Formula J described below are mixed at 75° C. and cast in aluminum moulds. The resulting castings, after having been cured for 24 hours at 140° C. and then for 24 hours at 200° C., display a heat distortion point according to Martens (DIN) of 138° C. Aluminum sheets coated with this casting resin mixture and cured for 5 hours at 180° C. are bonded to a shear strength of 2.6 kg./mm.²

The dianhydride of the Formula J used in the above example is prepared by reacting 1 mol of 1:4-bis(cyclopentadienyl)-butene-(2) with 2 mols of itaconic anhydride in the following manner:

112 parts of itaconic anhydride (melting at 68° C.) are added at 20° C. to a solution of 92 parts of 1:4-bis-(cyclopentadienyl)-butene-(2) (prepared as described in Example 2) in 250 parts of xylene. The turbid yellow solution is heated to 90° C. and kept at this temperature for 2½ hours, then cooled to 20° C., an unidentified, white pulverulent residue (3.0 parts) is filtered off and the solvent is evaporated under vacuum. Yield: 195 parts (=95.5% of the theoretical) of a light-yellow viscid resin.

| | Calculated | Found |
|---|---|---|
| Analysis.—$C_{24}H_{24}O_6$: | | |
| Percent C | 70.6 | 69.6 |
| Percent H | 5.9 | 5.8 |
| Equivalents of anhydride groups per kg | 4.91 | 4.91 |

*Example 23.*—Curing a mixture of an unsaturated polyester and a liquid epoxy resin with a Diels-Alder adduct from 1:5-bis(cyclopentadienyl)pentane and maleic anhydride 100 parts of the unsaturated polyester described below, 31 parts of the liquid epoxy resin used in Example 1 and 44 parts of the Diels-Alder adduct from 1:5-bis(cyclopentadienyl)pentane and maleic anhydride described below are mixed at 120° C. Aluminum sheets (170 x 25 x 2 mm.; overlap 10 mm.) are cemented with this mixture as described in Example 1 and cured for 5 hours at 180° C. The resulting bond displays a shear strength of 4.45 kg./mm.²

The unsaturated polyester used above is prepared in the following manner:

129.1 parts of ethyleneglycol
339.5 parts of diethyleneglycol
156.9 parts of maleic anhydride
355.5 parts of phthalic anhydride
116.9 parts of adipic acid and
0.1 part of hydroquinone are dissolved with heating. The solution is heated to 200° C. and esterified, while distilling off the water of reaction and passing over nitrogen, for 3 hours under atmospheric pressure. The batch is then further esterified for 5 hours at the same temperature under reduced pressure until the polyester has attained an acid number of 17.

There are obtained 989 parts of a viscous liquid containing 1.62 double bond equivalents per kg. and having an average molecular weight of 3010.

The Diels-Alder adduct from 1:5-bis(cyclopentadienyl)-pentane and maleic anhydride used in this example is prepared as the Diels-Alder adduct described in Example 1, except that instead of 366 parts only 165 parts of maleic anhydride are used. Yield: 419 parts (=75.6% of the theoretical) of a solid resin.

*Analysis.*—3.20 equivalents of anhydride groups per kg.

*Example 24.*—*Curing a mixture of an unsaturated polyester and a liquid epoxy resin with a Diels-Alder adduct from 1:3-bis(cyclopentadienyl)propane and maleic anhydride*

100 parts of the unsaturated polyester used in Example 23, 30 parts of the liquid epoxy resin used in Example 1 and 39 parts of the Diels-adduct from 1:3-bis(cyclopentadienyl)propane and maleic anhydride described below are mixed at 100° C. Aluminum sheets are cemented with this mixture as described in Example 1 and cured for 5 hours at 180° C. The bonded sheets display a shear strength of 3.5 kg./mm.$^2$.

The Diels-Alder adduct from 1:3-bis(cyclopentadienyl)-propane and maleic anhydride used in this example is obtained in the manner described in Example 1 for the manufacture of the Diels-Alder adduct, except that the 430 parts of 1:5-dibromopentane are replaced by 378 parts of 1:3-dibromopropane and instead of 366 parts only 169 parts of maleic anhydride are used. Yield: 396 parts (=79% of the theoretical) of a viscid resin.

| | Calculated | Found |
|---|---|---|
| Analysis.—$C_{34}H_{36}O_6$: | | |
| Percent C | 75.5 | 74.6 |
| Percent H | 6.7 | 7.1 |
| Equivalents of anhydride groups per kg | 3.7 | 3.5 |

*Example 25.*—*Curing a mixture of an unsaturated polyester, an epoxy resin and a partially hydrolyzed Diels-Alder adduct from 1:5-bis(cyclopentadienyl)pentane and maleic anhydride*

100 parts of the unsaturated polyester used in Example 23, 23 parts of the epoxy resin used in Example 1 and 26 parts of the partially hydrolyzed Diels-Alder adduct described below are mixed at 100° C. and used for cementing aluminum sheets as described in Example 1. The bond achieved by curing for 5 hours at 180° C. displays a shear strength of 3.2 kg./mm.$^2$.

The Diels-Alder adduct used above is the same Diels-Alder adduct as described in Example 1, but it has been partially hydrolysed. To prepare it, the method of Example 1 is used, adding 50 parts of water to the reaction mixture after the addition of maleic anhydride and before working up, and leaving the batch to itself for several hours; it is then dried with sodium sulfate and the solvent is removed under reduced pressure. The resulting reaction product contains 2.85 equivalents of free acid groups per kg.

*Example 26.*—*Curing a mixture of an unsaturated polyester and a liquid epoxy resin with a Diels-Alder adduct from 1:8-bis(cyclopentadienyl)octane and maleic anhydride*

100 parts of the unsaturated polyester used in Example 23, 27 parts of the liquid epoxy resin used in Example 1 and 46 parts of the Diels-Alder adduct from 1:8-bis(cyclopentadienyl)octane and maleic acid described below are mixed at 100° C. Aluminum sheets (170 x 25 x 2 mm.; overlap 10 mm.) are cemented with this mixture as described in Example 1 and cured for 5 hours at 180° C. The bond thus achieved has a shear strength of 4.1 kg./mm.$^2$.

The Diels-Alder adduct from 1:8-bis(cyclopentadienyl)octane and maleic anhydride used in this example is prepared as described for the Diels-Alder adduct in Example 1, except that the 430 parts of 1:5-dibromopentane are replaced by 508 parts of 1:8-dibromooctane and instead of 366 parts only 165 parts of maleic anhydride are used. Yield: 561 parts (=88% of the theoretical) of a very viscid, brown resin.

*Analysis.*—2.62 equivalents of anhydride groups per kg.

*Example 27.*—*Curing a mixture of an unsaturated polyester and a liquid epoxy resin with a Diels-Alder adduct from 1:10-bis(cyclopentadienyl)decane and maleic anhydride*

100 parts of the unsaturated polyester used in Example 23, 31 parts of the liquid epoxy resin used in Example 1 and 54 parts of the Diels-Alder adduct from 1:10-bis(cyclopentadienyl)decane and maleic anhydride described below are mixed at 80° C. Aluminum sheets are cemented with this mixture as described in Example 1 and cured for 5 hours at 180° C. The resulting bond has a shear strength of 3.45 kg./mm.$^2$.

The Diels-Alder adduct used above, from 1:10-bis-(cyclopentadienyl)decane and maleic anhydride, is prepared like the Diels-Alder adduct described in Example 1, except that the 430 parts of 1:5-dibromopentane are replaced by 561 parts of 1:10-dibromodecane and instead of 366 parts only 165 parts of maleic anhydride are used. Yield: 650 parts (=95% of the theoretical) of a brown, viscous liquid.

*Analysis.*—2.1 equivalents of anhydride groups per kg.

*Example 28.*—*Curing of a mixture of an unsaturated polyester and a liquid epoxy resin with a Diels-Alder adduct from 1:4-bis(cyclopentadienyl)-butene-(2) and maleic anhydride*

100 parts of the unsaturated polyester used in Example 13, 61 parts of the epoxy resin used in Example 1 and 77 parts of the Diels-Alder adduct from 1:4-bis(cyclopentadienyl)-butene-(2) and maleic anhydride described below are mixed at 140° C. and cast in aluminum moulds as described in Example 1. After having been cured for 24 hours at 140° C. and then for 24 hours at 180° C. the resulting castings display the following properties:

| | |
|---|---|
| Flexural strength, kg./mm.$^2$ | 7.0 |
| Impact strength, cm. kg./cm.$^2$ | 7.1 |
| Modulus of elasticity, kg./mm.$^2$ | 608 |
| Heat distortion point accdg. to Martens (DIN), ° C. | 120 |
| Water absorption (1 hour at 100° C.), percent | 0.28 |

The above casting resin mixture is also suitable for cementing aluminum sheets as described in Example 1; after having been cured for 5 hours at 180° C. the bond displays a shear strength of 2.9 kg./mm.$^2$.

The Diels-Alder adduct used above is prepared like the Diels-Alder adduct described in Example 13, except that instead of 40 parts of maleic anhydride 69 parts thereof are used; yield: 192 parts of a highly viscous resin.

*Analysis.*—3.55 equivalents of anhydride groups per kg.

*Example 29.*—*Curing a mixture of an unsaturated polyester and a liquid epoxy resin with a Diels-Alder adduct from 1:4-bis(cyclopentadienyl)-butene-(2) and itaconic anhydride*

100 parts of the unsaturated polyester used in Example 13, 145 parts of the liquid epoxy resin used in Example 1 and 157 parts of the Diels-Alder adduct from 1:4-bis(cyclopentadienyl)-butene-(2) and itaconic anhydride described below are mixed at 80° C. and cast in aluminum moulds. After having been cured for 24 hours at 140° C. and then for 24 hours at 180° C. the resulting castings display the following properties:

| | |
|---|---|
| Flexural strength, kg./mm.$^2$ | 8.8 |
| Impact strength, cm. kg./cm.$^2$ | 5.7 |
| Heat distortion point accdg. to Martens (DIN), ° C. | 121 |

Aluminum sheets cemented with the above casting resin mixture and cured for 5 hours at 180° C. display a shear strength of the bond of 1.06 kg./mm.$^2$.

The Diels-Alder adduct from 1:4-bis(cyclopentadienyl)-butene-(2) and itaconic anhydride used in the above example is prepared in the following manner:

84 parts of itaconic anhydride (melting at 68° C.) are reacted with 138 parts of 1:4-bis(cyclopentadienyl)-butene-(2) as described in Example 22, to yield 179 parts of a yellow, clear, viscid resin.

*Analysis.*—4.12 equivalents of anhydride groups per kg.

*Example 30.—Curing a mixture of an unsaturated polyester and a liquid epoxy resin with a Diels-Alder adduct from 1:4-bis(cyclopentadienyl)-cyclopentene-(2) and maleic anhydride*

100 parts of the unsaturated polyester used in Example 13, 21 parts of the liquid epoxy resin used in Example 1 and 46 parts of the Diels-Alder adduct from 1:4-bis(cyclopentadienyl)-cyclopentene-(2) and maleic anhydride described below are dissolved in 100 parts of chloroform and used for cementing aluminum sheets as described in Example 1. The cemented sheets obtained by curing for 5 hours at 180° C. display a shear strength of the bond of 2.4 kg./mm.$^2$.

The Diels-Alder adduct used above is prepared in the following manner:

537 parts of 1:4-dibromocyclopentene-(2) are stirred at 16–22° C. into an externally cooled solution of cyclopentadienyl sodium in tetrahydrofuran, prepared as described in Example 1 from 500 parts of xylene, 650 parts of tetrahydrofuran, 115 parts of sodium, 14.8 parts of tertiary butanol, 0.1 part of phenyl-$\beta$-naphthylamine and 363 parts of cyclopentadiene. The batch is neutralized with 22 parts of glacial acetic acid and the sodium bromide formed is filtered off. The filter cake is repeatedly rinsed with xylene. While cooling the filtrate externally, 107 parts of maleic anhydride are stirred in at 20° C. The mixture is heated to 80° C. and kept for 2 hours at this temperature. On evaporation of the solvent under vacuum there are obtained 497 parts of a black, brittle resin.

*Analysis.*—2.1 equivalents of anhydride groups per kg.

*Example 31.—Curing a mixture of an unsaturated polyester, a liquid epoxy resin and a Diels-Alder adduct from 4:6 - bis(cyclopentadienylmethyl)-1:3-dimethylbenzene and maleic anhydride*

100 parts of the unsaturated polyester used in Example 23, 19 parts of the epoxy resin used in Example 1 and 34 parts of the Diels-Alder adduct described below are mixed at 120° C. and the mixture is used for cementing aluminum sheets (170 x 25 x 2 mm.; overlap 10 mm.) as described in Example 1 which are then cured for 5 hours at 180° C. The bond displays a shear strength of 4.46 kg./mm.$^2$.

The Diels-Adler adduct used above is prepared like the Diels-Alder adduct used in Example 19, except that, tetrahydrofuran is used as solvent instead of the mixture of xylene and ethyleneglycol diethyl ether, as in Example 1, and instead of 146 parts only 97 parts of maleic anhydride are used. Yield: 358 parts of a solid resin.

*Analysis.*—2.55 equivalents of anhydride groups per kg.

*Example 32.—Curing a mixture of an unsaturated polyester, an epoxy resin and a Diels-Alder adduct from 1:3-bis(cyclopentadienylmethyl) - 2:4:6 - trimethylbenzene and maleic anhydride*

100 parts of the unsaturated polyester used in Example 23, 25 parts of the epoxy resin used in Example 1 and 48 parts of the Diels-Alder adduct described below are mixed at 100° C. and the mixture is used for cementing aluminum sheets as described in Example 1. After having been cured for 5 hours at 180° C., the resulting bond has a shear strength of 3.6 kg./mm.$^2$.

The Diels-Alder adduct used above is prepared in the same way as the Diels-Alder adduct described in Example 1, except that the 430 parts of 1:5-dibromopentene are replaced by 406 parts of 1:3-bis(chloromethyl)-2:4:6-trimethylbenzene and instead of 366 parts only 189 parts of maleic anhydride are used. Yield: 704 parts (=100% of the theoretical) of a yellow, brittle resin.

*Analysis.*—2.3 equivalents of anhydride groups per kg.

*Example 33.—Curing an epoxy resin with a Diels-Alder adduct from bis(cyclopentadienylmethyl)ether and maleic anhydride*

100 parts of the epoxy resin used in Example 1 are mixed at 190° C. with 90 parts of the Diels-Alder adduct from $\alpha{:}\alpha'$-bis(cyclopentadienylmethyl)ether and maleic anhydride described below and cast in aluminum moulds. After having been cured for 24 hours at 140° C. and then for 24 hours at 180° C., the resulting castings display the following properties:

Flexural strength, kg./mm.$^2$ _____ 2.7
Impact strength, cm. kg./cm$^2$ _____ 1.4
Modulus of elasticity, kg./mm.$^2$ _____ 537
Heat distortion point accdg. to Martens (DIN),
° C. _____ 218

The Diels-Alder adduct used above is prepared as the Diels-Alder adduct described in Example 1, except that the 430 parts of 1:5-dibromopentane are replaced by 125 parts of bis(chloromethyl) ether (which is added at 7–8° C.) and instead of 366 parts only 297 parts of maleic anhydride are used. For working up the solvent is removed under reduced pressure as described in Example 1 but, instead of raising the temperature finally to 150° C., it is ensured that the temperature does not rise above 45° C. Yield: 605 parts of a yellowish brown, brittle resin. Softening point: 95–100° C. (measured on the Kofler heater).

*Analysis.*—5.03 equivalents of anhydride groups per kg.

*Example 34.—Curing a mixture of an unsaturated polyester, an epoxy resin and a Diels-Alder adduct from $\alpha{:}\alpha'$-bis(cyclopentadienylmethyl) ether and maleic anhydride*

100 parts of the polyester used in Example 23, 24 parts of the epoxy resin used in Example 1 and 34 parts of the Diels-Alder adduct described below are mixed at room temperature and the mixture is used for cementing aluminum sheets as described in Example 1 which are then cured for 5 hours at 180° C. The resulting bond has a shear strength of 3.4 kg./mm.$^2$.

The Diels-Alder adduct used above is prepared like the Diels-Alder adduct described in Example 33, except that instead of 297 parts only 186 parts of maleic anhydride are used.

The resulting brown, brittle resin contains 3.16 equivalents of anhydride groups per kg.

*Example 35.—Curing a mixture of an unsaturated polyester, an epoxy resin and a Diels-Alder adduct from $\beta{:}\beta'$-bis(cyclopentadienyl)diethyl ether and maleic anhydride*

100 parts of the unsaturated polyester used in Example 13, 52 parts of the epoxy resin used in Example 1 and 74 parts of the Diels-Alder adduct described below are mixed at 120° C. and cast in aluminum moulds. After having been cured for 24 hours at 140° C. and then for 24 hours at 180° C. the resulting castings display the following properties:

Flexural strength, kg./mm.$^2$ _____ 14.4
Impact strength, cm. kg./cm.$^2$ _____ 7.6
Modulus of elasticity, kg./mm.$^2$ _____ 490
Heat distortion point accdg. to Martens (DIN),
° C. _____ 66

Aluminum sheets cemented with a mixture of 100 parts of the polyester used above, 35 parts of the epoxy resin used above and 50 parts of the Diels-Alder adduct used above and cured for 5 hours at 180° are bonded to a shear strength of 3.5 kg./mm.$^2$.

The Diels-Alder adduct used above is prepared like the Diels-Alder adduct described in Example 1, except that the 430 parts of 1:5-dibromopentane are replaced by 267 parts of β:β'-bis(chloroethyl) ether and instead of 366 only 183 parts of maleic anhydride are used.

During the evaporation of the solvent it must be ensured that the temperature does not rise above 80° C. Yield: 558 parts of a viscous resin.

*Analysis.*—3.15 equivalents of anhydride groups per kg.

*Example 36.—Curing a mixture of an unsaturated polyester, a liquid epoxy resin, a Diels-Alder adduct from 1:4-bis(cyclopentadienyl)-butene-(2) and maleic anhydride, and asbestos powder*

76 parts of the unsaturated polyester used in Example 13, 53 parts of a diglycidyl ether containing 11.6 epoxide equivalents per kg. [prepared by reacting 2-butene-1:4-diol with epichlorohydrin in the presence of alkali], 204 parts of the Diels-Alder adduct used in Example 28 from 1:4-bis(cyclopentadienyl)-butene-(2) and maleic anhydride and 167 parts of asbestos powder are intimately mixed at 110° C. The mixture, which is paste-like at room temperature, is an excellent bonding agent for metals which produces bonds that are stable at high temperatures: Sheets of stainless steel, marketed under the trademark "CrNiSt 18/8" (170 x 25 x 1 mm.; overlap 10 mm.) are coated with the resin mixture at 100° C., clamped and cured for 5 hours at 180° C. and then for 10 hours at 200° C. The shear strength of a first, cured sandwich is tested immediately, while a second cured test specimen is tested after having been stored for 30 days in an air oven at 200° C.

| Test | Shear strength kg./mm.², measured at— | |
|---|---|---|
| | Room temperature | 200° C. |
| 1 | 1.4 | 1.0 |
| 2 | | 1.3 |

*Example 37.—Curing a mixture of an unsaturated polyester, a liquid epoxy resin, a Diels-Alder adduct from 1:4-bis(cyclopentadienyl)butene-(2) and maleic acid anhydride, and asbestos powder*

74 parts of the unsaturated polyester described below, 53 parts of the liquid diglycidyl ether used in Example 36, 206 parts of the Diels-Alder adduct used in Example 28 from 1:4-bis(cyclopentadienyl)-butene-(2) and maleic acid anhydride, and 167 parts of asbestos powder are intimately mixed at 130° C. The resulting bonding agent, which is paste-like at room temperature, is used as described in Example 36 for cementing sheets of stainless steel which are then cured for 5 hours at 180° C. and for 10 hours at 200° C. The shear strength of one such sandwich is tested immediately, whereas a second specimen is tested after having been stored for 30 days in an air oven at 200° C.

| Test | Shear strength kg./mm.², measured at— | |
|---|---|---|
| | Room temperature | 200° C. |
| 1 | 1.4 | 1.4 |
| 2 | | 0.5 |

The unsaturated polyester used above is prepared in the following manner:

A mixture of 498 parts of isophthalic acid, 478 parts of propyleneglycol and 0.1 part of hydroquinone is esterified under nitrogen at 200° C., while distilling off the water of reaction formed, until an acid number of 10.3 has been reached. 294 parts of maleic anhydride are then added and the esterification is continued to an acid number of 27. Yield: 1053 parts of a resin which is solid at room temperature.

*Example 38.—Curing a mixture of an unsaturated polyester, a solid epoxy resin, a Diels-Alder adduct from 1:4-bis(cyclopentadienyl)-butene-(2) and maleic anhydride, and asbestos powder*

108 parts of the unsaturated polyester used in Example 37, 100 parts of the novolak polyglycidyl ether described below, 125 parts of the Diels-Alder adduct used in Example 28 from 1:4-bis(cyclopentadienyl)-butene-(2) and maleic anhydride, and 167 parts of asbestos powder are stirred at −40° C. to form a fine powder. The bonding agent is solid at room temperature and may be used as it is, or to facilitate its application it may be cast with a solvent into foils, or the powder may be moulded, for example at 100° C., in rod form.

Sheets of stainless steel are coated with the above bonding agent at 150° C. as described in Example 36, clamped and cured for 5 hours at 180° C. and then for 10 hours at 200° C. A first specimen is tested immediately and a second specimen after having been stored for 30 days in an air oven at 200° C.

| Test | Shear strength kg./mm.², measured at— | |
|---|---|---|
| | Room temperature | 200° C. |
| 1 | 1.66 | 1.2 |
| 2 | | 1.0 |

The novolak polyglycidyl ether used above is prepared in the following manner:

Phenol (1 mol) and formaldehyde (0.85 mol) in the form of an aqueous solution of 30.4% strength are condensed with addition of a catalytic amount of concentrated hydrochloric acid, then neutralized with sodium hydroxide solution and the water is removed under vacuum; the batch is then etherified with 4 mols of epichlorohydrin in the presence of 1 mol of sodium hydroxide solution. The resulting novolak polyglycidyl ether is a yellow, brittle resin and has a softening point of 58° C. (measured on a Kofler heater).

*Analysis.*—5.2 equivalents of epoxide groups per kg.

*Example 39*

11.4 parts of the Diels-Alder adduct from 1:4-bis-(cyclopentadienyl)-butene-(2) and maleic anhydride used in Example 13, 23.3 parts of the unsaturated polyester described below and 8.8 parts of a solid epoxy resin having a softening point of 50° C. (measured on a Kofler heater) and containing 2.1 epoxide equivalents per kg. [prepared by reacting bis(4-hydroxyphenyl)-dimethylmethane with epichlorohydrin in the presence of alkali] are dissolved in a mixture consisting of 20 parts of ethyleneglycol monoethyl ether, 7.4 parts of methylethyl ketone and 24.3 parts of dioxane. 0.5 part of a solution of 1% strength of silicone oil "SF 69" (registered trademark of General Electric) in xylene and 4.3 parts of a 10% solution of phosphoric acid of 85% strength in ethyleneglycol monoethyl ether are then added, and the resulting clear lacquer is applied with a spraygun to sheets of iron and aluminum. On stoving for ½ hour at 180° C. a glossy, colorless to faintly yellowish coat having a hard surface free from pitting is obtained which has an indentation value according to Erichsen of 8.8 mm. The acetone test is very good (that is to say that a swab of cotton-wool saturated with acetone leaves no visible signs of damage when passed vigorously 10 times to and fro over the lacquer surface).

Such a lacquer coat will very well withstand boiling for 4 hours in water, after which the indentation value according to Erichsen will still be 5.2 mm. When the coated aluminum sheets are immersed for 4 hours in acetic acid of 2% strength at 98° C., the indentation value according to Erichsen drops only slightly, namely to 7.0 mm.

The unsaturated polyester used above is prepared in the following manner:

A mixutre of 588 parts of maleic anhydride, 655 parts of 2:2-dimethyl-1:3-propanediol and 0.25 part of hydroquinone is esterified under nitrogen at 150 to 200° C., which is accompanied by elimination of water, until an acid number of 35 has been reached. Yield: 1136 parts of a viscid resin.

*Example 40*

90 parts of a solid epoxy resin having a softening point of 90–100° C. (measured on a Kofler heater) and containing 0.54 epoxide equivalent per kg. [prepared by reacting bis(4-hydroxyphenyl)-dimethylmethane with epichlorohydrin in the presence of alkali], 80 parts of the Diels-Alder adduct from 1:4-bis(cyclopentadienyl)-butene-(2) and maleic anhydride used in Example 2, and 10 parts of propyleneglycol having an average molecular weight of 1025 are dissolved in a mixture of the following solvents to give a clear solution of 25% strength of brushing consistency:

| Solvent: | Parts by volume |
|---|---|
| Benzyl alcohol | 5 |
| Xylene | 20 |
| Butyl acetate | 20 |
| Methylethyl ketone | 15 |
| Ethyleneglycol monoethyl ether | 30 |
| Diacetone alcohol | 10 |

Aluminum sheets are brushed with this lacquer and then stoved at 250° in an air oven.

| Stoving time | Acetone test [1] | Adhesivity [2] |
|---|---|---|
| 10 minutes | Very good | Very good. |
| 60 minutes | ----do---- | Do. |

[1] For description of acetone test see Example 39.
[2] The adhesivity is classed "very good" when, after having been folded twice (as when a sheet of paper is folded once and then once more at right angles to the first fold), the lacquer still adheres to the metal without displaying any signs of damage to the surface.

*Example 41*

A clear lacquer is prepared as described in Example 40 except that the 80 parts of a Diels-Alder adduct from 1:4-bis(cyclopentadienyl)-butene-(2) and maleic acid anhydride are replaced by 160 parts of a solution of a partially hydrolyzed Diels-Alder adduct prepared in the following manner:

455 parts by volume of a xylene solution of 112 parts of 1:4-bis(cyclopentadienyl)-butene-(2) [prepared as described in Example 2] are mixed with 119 parts of maleic anhydride, and the mixture is heated for 5 hours at 120° C. 22 parts of water and 110 parts of tetrahydrofuran are then added, and the whole is heated for 7 hours at 70° C. The resulting solution has a solids content of 50%.

*Analysis of the solution.*—0.38 equivalent of anhydride groups per kg.; 2.89 equivalents of acid groups per kg.

Aluminum sheets brushed with the clear lacquer described above display after 10 minutes' and 60 minutes' stoving at 250° C. a very good stability towards acetone (acetone test "very good") and a very good adhesion.

*Example 42.*—*Curing a liquid epoxy resin with a tetracarboxylic acid dianhydride of the following structural formula*

(K)
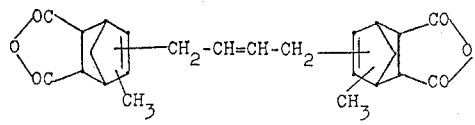

100 parts of the epoxy resin used in Example 1, 100 parts of the dianhydride of the Formula K described below and 4 parts of triamyl ammonium phenolate are mixed at room temperature and cast in aluminum moulds. After having been cured for 2 hours at 100° C., then for 2 hours at 150° C. and finally for 4 hours at 190° C., the resulting castings display the following properties:

| | |
|---|---|
| Flexural strength, kg./mm.$^2$ | 3.0 |
| Impact strength, cm. kg./cm.$^2$ | 1.6 |
| Heat distortion point accdg. to Martens (DIN), ° C | 137 |

The dianhydride (K) used above is prepared in the following manner:

115 parts of sodium are fused under 900 parts of toluene and finely dispersed. 15 parts of tertiary butanol are then added to the cooled mixture and while cooling it externally 440 parts of monomeric methylcyclopentadiene are stirred in at 45–50° C. On completion of the evolution of hydrogen 307 parts of 1:4-dichlorobutene-(2) are stirred in while cooling externally. 482 parts of maleic anhydride are then added and the solution is heated for 2 hours at 90° C. The sodium chloride formed is filtered off, the filter cake is rinsed with toluene and the solvent is removed under vacuum. Yield: 830 parts of a light-brown, viscid resin.

*Analysis.*—Equivalents of anhydride groups per kg., calculated: 4.9. Found: 4.5.

What is claimed is:
1. A thermo-curable resin composition of matter, which comprises (1) a 1:2-epoxy compound and (2) as curing agent a polyanhydride obtained by reacting at most $n$ molecular proportions of an unsaturated dicarboxylic acid anhydride selected from the group consisting of compounds of formula

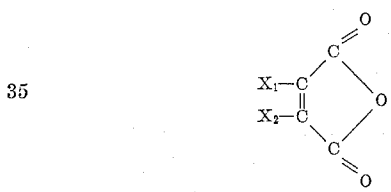

and compounds of formula

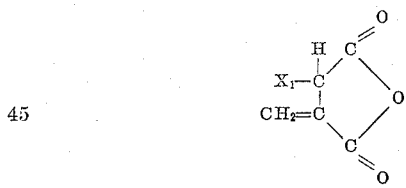

wherein $X_1$ and $X_2$ each are members selected from the group consisting of hydrogen atom and the methyl group, with 1 molecular proportion of a poly(cyclo-pentadienyl) compound of the formula

in which R is a member selected from the group consisting of

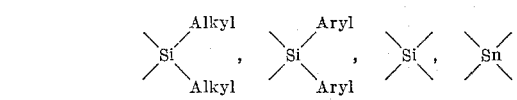

n-valent aliphatic hydrocarbon radicals, n-valent cycloaliphatic hydrocarbon radicals, n-valent araliphatic hydrocarbon radicals and n-valent aliphatic hydrocarbon radicals interrupted by oxygen bridges, $n$ is an integer of at least 2 and at the most 4, and $R_1$ is a member selected from the group consisting of hydrogen atom and the methyl group.

2. A thermo-curable resin composition of matter, which comprises (1) a 1:2-epoxy compound and (2) as curing agent a polycarboxylic acid obtained by reacting at most $n$ molecular proportions of an unsaturated dicarboxylic acid anhydride selected from the group consisting of compounds of formula

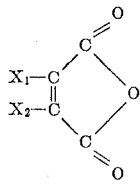

and compounds of formula

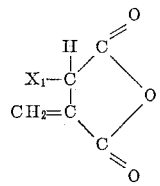

wherein $X_1$ and $X_2$ each are members selected from the group consisting of hydrogen atom and the methyl group, with 1 molecular proportion of a poly(cyclo-pentadienyl) compound of the formula

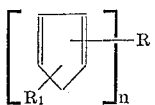

in which R is a member selected from the group consisting of

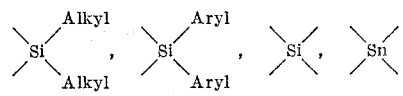

n-valent aliphatic hydrocarbon radicals, n-valent cycloaliphatic hydrocarbon radicals, n-valent araliphatic hydrocarbon radicals and n-valent aliphatic hydrocarbon radicals interrupted by oxygen bridges, $n$ is an integer of at least 2 and at the most 4, and $R_1$ is a member selected from the group consisting of hydrogen atom and the methyl group to form a polyanhydride, and subsequently hydrolyzing in said polyanhydride at least a part of the anhydride groups to carboxylic acid groups.

3. A thermo-curable resin composition of matter, which comprises (1) a 1:2-epoxy compound having a 1,2-epoxy equivalency greater than 1, and (2) as curing agent a polyanhydride obtained by reacting at most $n$ molecular proportions of an unsaturated dicarboxylic acid anhydride selected from the group consisting of compound of formula

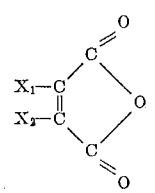

and compounds of formula

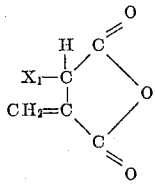

wherein $X_1$ and $X_2$ each are members selected from the group consisting of hydrogen atom and the methyl group, with 1 molecular proportion of a poly(cyclo-pentadienyl) compound of the formula

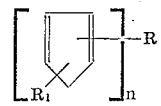

in which R is a member selected from the group consisting of

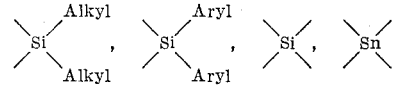

n-valent aliphatic hydrocarbon radicals, n-valent cycloaliphatic hydrocarbon radicals, n-valent araliphatic hydrocarbon radicals and n-valent aliphatic hydrocarbon radicals interrupted by oxygen bridges, $n$ is an integer of at least 2 and at the most 4, and $R_1$ is a member selected from the group consisting of hydrogen atom and the methyl group.

4. A thermo-curable resin composition of matter, which comprises (1) a 1:2-epoxy compound having a 1,2-epoxy equivalency greater than 1 and (2) as curing agent a polycarboxylic acid obtained by reacting at most $n$ molecular proportions of an unsaturated dicarboxylic acid anhydride selected from the group consisting of compounds of formula

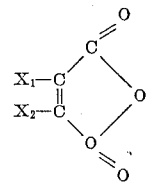

and compounds of formula

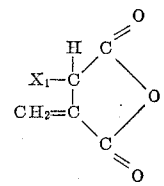

wherein $X_1$ and $X_2$ each are members selected from the group consisting of hydrogen atom and the methyl group, with 1 molecular proportion of a poly(cyclo-pentadienyl) compound of the formula

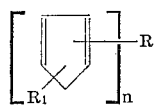

in which R is a member selected from the group consisting of

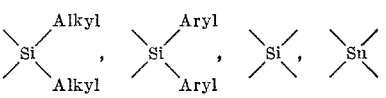

n-valent aliphatic hydrocarbon radicals, n-valent cycloaliphatic hydrocarbon radicals, n-valent araliphatic hydrocarbon radicals and n-valent aliphatic hydrocarbon radicals interrupted by oxygen bridges, $n$ is an integer of at least 2 and at the most 4, and $R_1$ is a member selected from the group consisting of hydrogen atom and the methyl group to form a polyanhydride and subsequently hydrolyzing in said polyanhydride at least a part of the anhydride groups to carboxylic acid groups.

5. A thermocurable resin composition, which comprises (1) a 1,2-epoxy compound having a 1,2-epoxy equivalency greater than 1, (2) as curing agent a polyanhydride obtained by reacting less than $n$ molecular proportions of an unsaturated dicarboxylic acid anhydride selected from the group consisting of compounds of formula

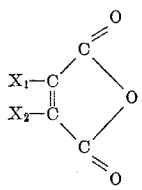

and compounds of formula

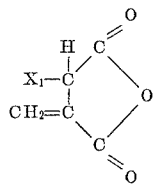

wherein $X_1$ and $X_2$ each are members selected from the group consisting of hydrogen atom and the methyl group, with 1 molecular proportion of a poly(cyclo-pentadienyl) compound of the formula

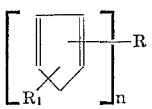

in which R is a member selected from the group consisting of

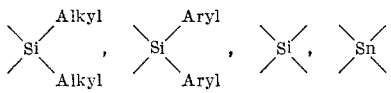

n-valent aliphatic hydrocarbon radicals, n-valent cycloaliphatic hydrocarbon radicals, n-valent araliphatic hydrocarbon radicals and n-valent aliphatic hydrocarbon radicals interrupted by oxygen bridges, $n$ is an integer of at least 2 and at the most 4, and $R_1$ is a member selected from the group consisting of hydrogen atom and the methyl group, and (3) an unsaturated polyester.

6. A composition as claimed in claim 4, which contains as the curing agent (2) the reaction product of 2 molecular proportions of maleic acid anhydride with 1 molecular proportion of 1,4-bis(cyclopentadienyl)-butene-(2).

7. A composition as claimed in claim 4, which contains as the curing agent the reaction product of 2 molecular proportions of maleic acid anhydride with 1 molecular proportion of 4,6-bis(cyclopentadienylmethyl)-1,3-dimethylbenzene.

8. A composition as claimed in claim 5, which contains as the curing agent the reaction product of less than 2 molecular proportions of maleic acid anhydride with 1 molecular proportion of 1,4-bis(cyclopentadienyl)-butene-(2).

9. A composition as claimed in claim 5, which contains as the curing agent the reaction product of less than 2 molecular proportions of maleic acid anhydride with 1 molecular proportion of 1,5-bis(cyclopentadienyl)-pentane.

10. A composition as claimed in claim 5, which contains as the curing agent the reaction product of less than 2 molecular proportions of maleic acid anhydride with 1 molecular proportion of 4,6-bis(cyclopentadienylmethyl)-1,3-dimethylbenzene.

11. A thermocurable adhesive composition, which comprises
    (1) a 1,2-epoxy compound having a 1,2-epoxy equivalency greater than 1;
    (2) as curing agent the reaction product of less than 2 molecular proportions of maleic acid anhydride with 1 molecular proportion of 1,4-bis(cyclopentadienyl)-butene-(2);
    (3) an unsaturated polyester; and
    (4) an inorganic filler.

References Cited by the Examiner

UNITED STATES PATENTS

| | | | |
|---|---|---|---|
| 2,667,501 | 1/1954 | Martin | 260—346.6 |
| 2,863,853 | 12/1958 | Pschorr | 260—78.4 |
| 2,912,442 | 11/1959 | Webster | 260—2 |

FOREIGN PATENTS

| | | |
|---|---|---|
| 812,675 | 4/1959 | Great Britain. |
| 886,601 | 1/1962 | Great Britain. |

SAMUEL H. BLECH, *Primary Examiner.*

MURRAY TILLMAN, *Examiner.*

J. C. BLEUTGE, *Assistant Examiner.*